United States Patent [19]

Sibley et al.

[11] 3,907,238
[45] Sept. 23, 1975

[54] OCCUPANCY DETECTOR FOR VEHICLE CONTROL SYSTEMS

[75] Inventors: Henry C. Sibley, Adams Basin; John H. Auer, Jr., Fairport; Willis R. Smith, Rochester, all of N.Y.

[73] Assignee: General Signal Corporation, Rochester, N.Y.

[22] Filed: May 20, 1974

[21] Appl. No.: 471,390

Related U.S. Application Data

[62] Division of Ser. No. 344,681, March 26, 1973, which is a division of Ser. No. 152,845, June 14, 1971, Pat. No. 3,748,466.

[52] U.S. Cl. .................................. 246/34 R; 246/77
[51] Int. Cl.² ......................................... B61L 21/06
[58] Field of Search ........ 246/77, 247, 34 R, 122 R, 246/63 R, 63 C, 63 A, 187 B, 187 C; 340/22, 31 R, 38 R

[56] References Cited
UNITED STATES PATENTS

| | | | |
|---|---|---|---|
| 2,895,042 | 7/1959 | Hailes | 246/122 R |
| 3,710,100 | 1/1973 | Perry | 246/63 C |
| 3,774,025 | 11/1973 | Auer | 246/187 B |

Primary Examiner—M. Henson Wood, Jr.
Assistant Examiner—Reinhard J. Eisenzopf
Attorney, Agent, or Firm—Milton E. Kleinman; Harold S. Wynn

[57] ABSTRACT

Vehicles are operated over a plurality of zones. Devices are provided on the vehicle for demarcating the ends thereof and wayside markers at an entering boundary, for each zone, responsive to the passage of each end of the vehicle, and assuming first and second conditions respectively in accordance with encountering an odd or even number of demarcating devices. Occupancy registration is responsive jointly to the first condition for the next two wayside markers in advance of the vehicle and the second condition for its associated marker for cancelling the occupancy indication. Occupancy registration is additionally responsive to the direction of traffic along the guideway by detecting vehicle presence as it enters the zone from either direction.

7 Claims, 20 Drawing Figures

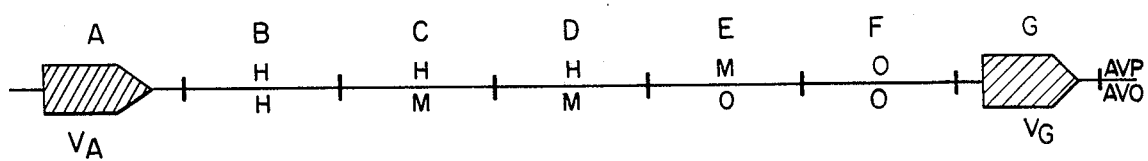
| # CLEAR BLOCKS | AVP | AVO |
|---|---|---|
| 4 | H | H |
| 3 | H | M |
| 2 | H | M |
| 1 | M | O |
FIG. 5
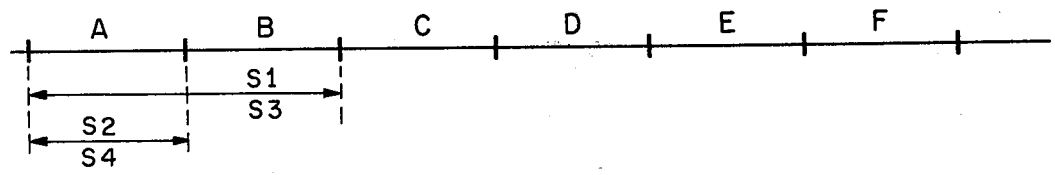
$$AVO \begin{cases} S1 = 2 \text{ BLOCKS} & H \rightarrow M \\ S2 = 1 \text{ BLOCK} & M \rightarrow O \end{cases}$$
$$AVP \begin{cases} S3 = 2 \text{ BLOCKS} & H \rightarrow O \\ S4 = 1 \text{ BLOCK} & M \rightarrow O \end{cases}$$
FIG. 6
| FIG. 1A | FIG. 1B |
|---|---|
| FIG. 7A | FIG. 7B | FIG. 7C |
|---|---|---|
| FIG. 8A | FIG. 8B |
|---|---|
| FIG. 10A | FIG. 10B |
|---|---|
| FIG. 12A | FIG. 12B |
|---|---|
FIG. 13

OCCUPANCY DETECTOR FOR VEHICLE CONTROL SYSTEMS

This is a division, of application Ser. No. 344,681 filed 3/26/73, which is a division of 152,845 filed 6-14-71 which issued as Pat. No. 3,748,466 on 7/24/73.

BACKGROUND OF INVENTION

This invention relates to occupancy detectors for vehicle control systems and in particular to such detectors for use in systems for controlling automatically the operation of a plurality of vehicles along guideways from centralized locations.

Operatorless automatic vehicle control systems require a number of safety and supervisory sub-systems for safe and efficient operation. Normally, an automatic vehicle protection system is necessary which must be substantially fail-safe in order to provide for safe public transportation. An automatic vehicle operation sub-system is included in order to provide the normal control of the vehicle within the restraints of the safety sub-system and a supervisory system is provided in order to provide such functions as, for example, performance monitoring, route control or other supervisory requirements.

The basic functions of an automatic vehicle control system must provide for protection of trains from head-on and rear-end collisions, speed regulation and, of course, safe passenger door operation. In addition, the system which operates automatically must establish safe remotely controlled switch routing and checking and include vehicle responsive apparatus which operates in accordance with certain supervisory controls.

When utilizing other than typical railroad vehicles for the transportation of persons in a rapid transit system, new concepts are employed in order to provide a safe system which encounters problems unique to non-railed vehicles. An obvious example would be the use of a vehicle shunt to determine the position of the train in the system, while with non-rail vehicles, it is apparent that some other system must be utilized which is at least as reliable as the vehicle shunt for determining the position of the vehicle.

To those familiar with railroad signaling art, it is obvious that conventional track coupled signaling means is not effective with a railess or air cushioned vehicle and that some effective means must be devised in order to communicate effectively between vehicle and the wayside and a centralized control location.

It is therefore an object of the present invention to provide an arrangement which substantially obviates one or more of the limitations and disadvantages of the described prior arrangements.

It is another object of the present invention to provide a system which may effectively determine the position, direction and safe speed of an automatically controlled vehicle.

It is another object of the present invention to provide an improved system for communicating between the vehicle and the wayside for maintaining those communications in a safe manner.

SUMMARY OF INVENTION

Occupancy detection for vehicle control system is obtained with means on the vehicle for demarcating the ends thereof and wayside marker means at an entering boundary for zones responsive to the passage of each end of the vehicle for respectively assuming first and second conditions in accordance with the passage of an odd or even number of demarcating means respectively. Occupancy means for each zone is responsive to its associated wayside marker and registers occupancy in accordance with the first condition until cancelled while reset means governs the occupancy means and is itself governed jointly by the first condition for the next two wayside markers in advance of the vehicle and the second condition for its associated marker for cancelling the occupancy indication.

The control system includes means for selecting the direction of traffic along a guideway and means responsive to the vehicle presence upon entering a zone from either direction for registering the occupancy condition thereof. The means governed jointly by the occupancy responsive means and the direction selecting means renders the control means operative to restrictive aspects in accordance with the selected number of zones behind the leading vehicle relative to the selected direction of traffic.

For a better understanding of the present invention, together with other and further objects thereof, reference is had to the following description taken in connection with the accompanying drawings, while its scope will be pointed out in the appended claims.

DESCRIPTION OF THE DRAWINGS

FIG. 5 is a diagram showing the distribution of speed limit and command controls for a number of occupied blocks.

FIG. 6 is a diagram showing safe stopping distances for speed limit control and speed command control.

FIG. 13 shows the relation of partitioned drawings.

DESCRIPTION OF THE PREFERRED EMBODIMENTS

Figure 1A:
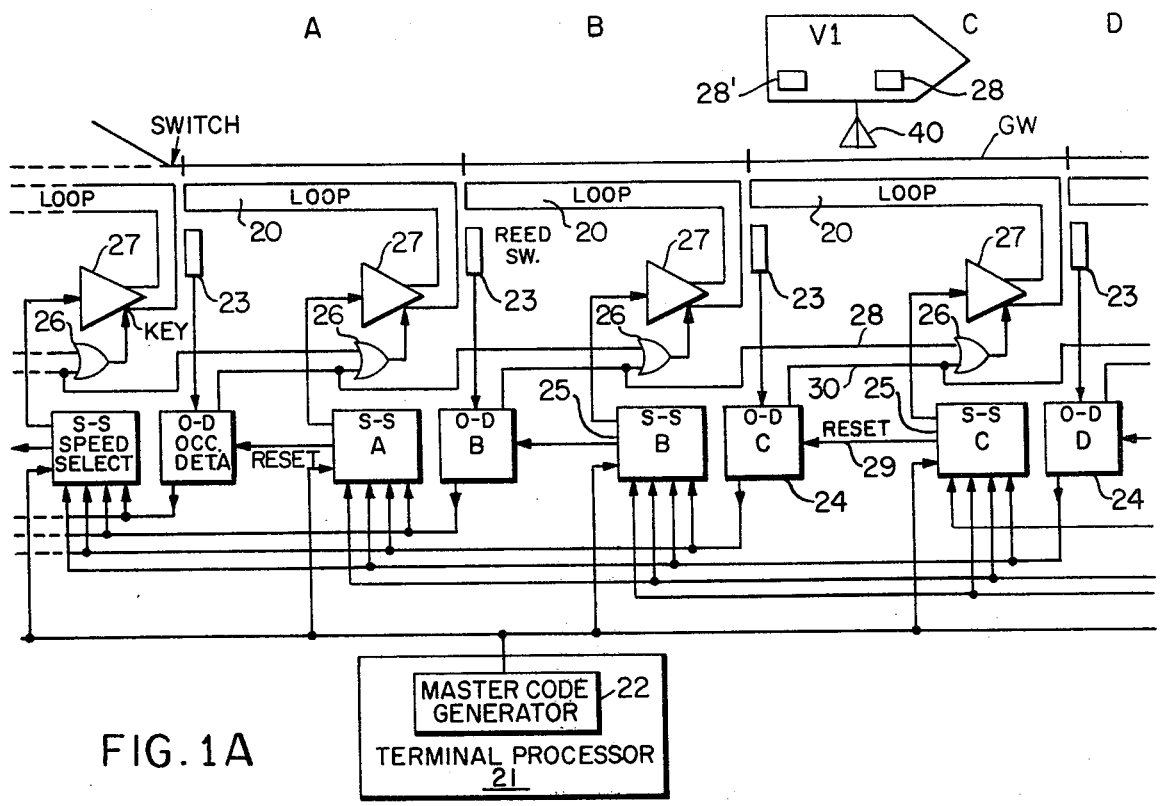
FIGS. 1A and 1B are diagrams of the general plan of the present invention.

The system of the present invention generally includes systems for automatic vehicle protection AVP, automatic vehicle operation AVO, and automatic vehicle supervision AVS.

The automatic vehicle protection safety subsystem includes normally located wayside elements for vehicle protection, block occupancy memory, vehicle control signal generation, selection and transmission, switch interlocking and control, and platform door control. On the vehicle, safety hardware is included for receiving vehicle control signals, for governing the maximum speed, for initiating irrevocable stops on either a service or emergency brake basis as required, for permitting automatic door operation only when safe, and for preventing automatic movement in the reverse direction.

Other parts of this system which are necessary for efficient controls of the vehicle include transmitters and receivers for communicating digital information from the lead vehicle of these trains to the wayside at approaches to switches and station platforms. These messages contain information relative to the routing of the vehicle, the identity and malfunction status, and station operation. Apparatus is also provided for communicating digital data from the wayside to terminal processors serving a number of designated areas. These terminal processers serve as intermediate links between the wayside and the central processing unit.

A general description of this system proceeds as follows in respect to FIGS. 1A and 1B. The system comprises a guideway layout GW divided into a number of blocks of which blocks A through G are shown in the drawing. Vehicle VI travels within the guideway GW in one of a number of selected routes as established by commands communicated from the vehicle VI to the wayside for controlling the switches SW. Each block includes a wayside loop 20 which extends the full length of the block for continually transmitting information to the vehicle within the particular block, in this case vehicle VI. A terminal processor 21, couples the apparatus with a centralized location having a master process control computer, not shown. Communications from the computer are transmitted to each vehicle (and individual wayside located apparatus) over the terminal processor 21 for a selected area. Each terminal processor 21 provides a link between the computer and a number of related blocks. Each block includes communication apparatus linking the terminal processor 21 and the vehicle VI located therein.

The terminal processor 21 includes a master control generator 22 which in this embodiment produces a number of code rate frequencies. For purposes of speed selection, three frequencies F1, F2 and F3 are utilized, F1 and F2 respectively indicative of low and medium speed limits and the combination of F1 and F2 high speed limit. F3 is used in conjunction with the F1 and F2 signals for varying command speeds transmitted to the vehicle V1. That is, F1 and F2 are used to designate speed limits, while combinations of F1, F2 and F3 indicate the command speeds which are less than or equal to speed limit signals. Speed commands are used in conjunction with speed limits of low, medium and high as shown in the following table:

| Speed Limit | Zero | Low | Medium | Medium | High | High |
|---|---|---|---|---|---|---|
| Speed Command Signals | Zero | Zero | Zero | Low | Medium | High |
| | None | F1 | F2 | F2,F3 | F1,F2 | F1,F2,F3 |

The additional frequency F3 is utilized to add versatility to the system so that speed commands and speed limits have different characteristics. In addition, the F3 signal is communicated over non-vital apparatus because it is not necessary to provide fail-safe communications for the speed command. The reason for this is that the speed limits control and the vehicle will go into an emergency stop condition if it is travelling faster than the speed limit signal permits regardless of the speed command signal.

Figure 1B:
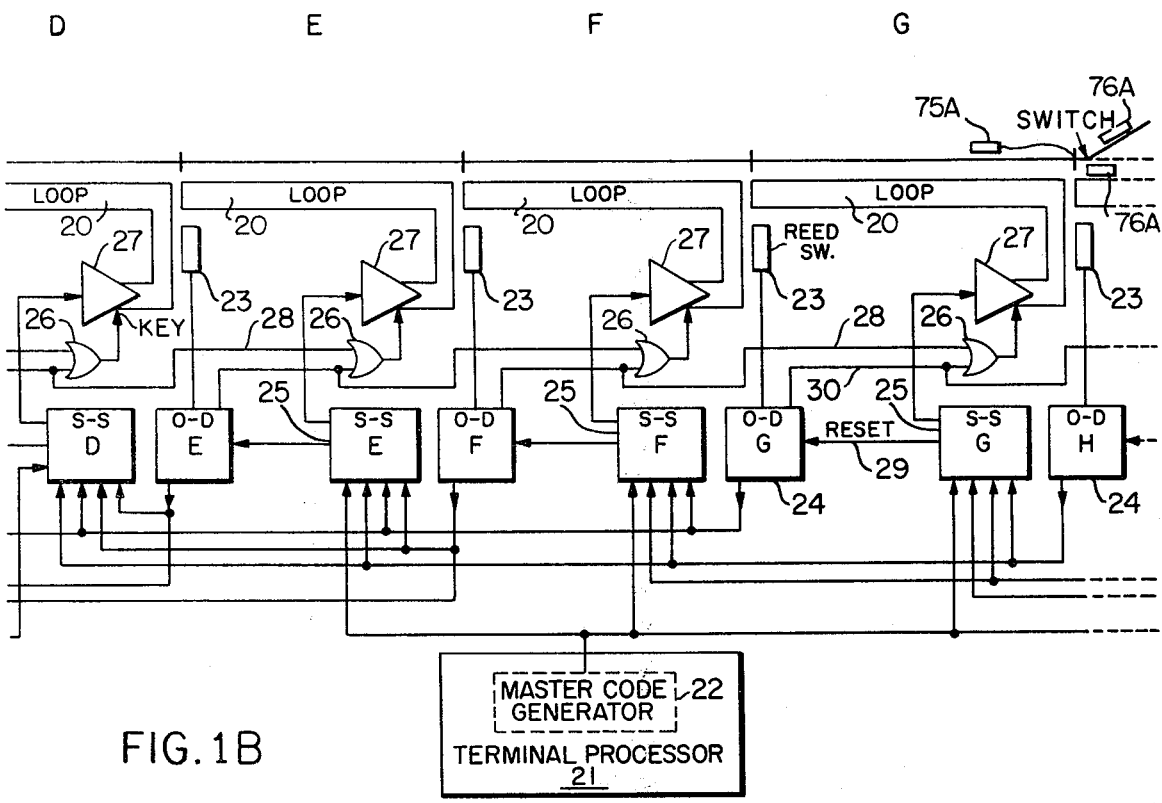

The layout of FIGS. 1A & 1B illustrates the general configuration of the system with respect to communication of speed limits and speed controls to the loops 20 in accordance with the condition of blocks in advance of the vehicle V1. Each block has a block occupancy sensor 23 which read transmitters 28–28' for demarcating the ends of the vehicle. When the front or leading end of the vehicle encounters the sensor 23, occupancy is registered for that block, in this case, block C. Occupancy detector 24 registers the occupancy of the vehicle in block C and transmits a signal rearwardly to speed selection units 25 for at least four previous blocks. It should be noted that this diagram is a plan view of the system and it is intended that the vehicle may travel in either direction along the guideway GW. For purposes of simply illustrating the concept of the invention in this drawing, control is shown only for one direction; that is, from left to right. The drawing shows the vehicle V1 in block C, therefore, the detector 23 has provided a signal to the occupancy detector 24 for registering occupancy of the vehicle V1 in block C. In addition, the speed selectors 25 for the preceding four blocks receive a signal that block C is occupied and their speed controls are adjusted in accordance with a preselected speed limit pattern for this configuration. Such a pattern, for example, may provide that block B directly in back of the vehicle is at stop, while block A is at low speed and the previous two blocks, not shown, may be at some medium or high speed in accordance with the safe stopping characteristics of vehicle V1 following. For purposes of this discussion, however, it is only necessary to show that some selected number of blocks rearward of the vehicle must be informed of the occupancy status of the vehicle.

The occupancy detector 24 provides a signal to OR gate 26 which initiates a signal to amplifier 27 which is keyed for enabling communication of speed code signals to the loop 20 from the speed selection unit 25 associated with block C. In addition to keying the amplifier 27 for the loop 20 in block C, a line 28 is also coupled to the OR gate 26 for block D in advance of the vehicle; so that block is keyed for the approach of the vehicle V1 as it crosses from C to D. When the vehicle V1 leads or crosses the boundary into block D, its condition V1 is detected for block D by the sensor 23 and registered in the associated occupancy detector 24 for block D. This condition is immediately communicated to the speed selection unit 25 for block C which resets the occupancy detector for block C along lead 29. This cuts off the input to OR gate 26 along lead 30 and removes the keying from the amplifier 27 for block C. Under these conditions, the vehicle entering block C while block D is occupied will be placed in an irrevocable emergency braking situation because no signals are communicated to loop 20 for block C. Such a condition is indicative of a malfunction because, as previously stated, at least one clear block must be provided rearward of a vehicle. As the train progresses along the guideway GW, it keys the block ahead and resets the block behind thereby providing itself with a protective zone and information relative to its position is communicated to at least four blocks rearward of the vehicle so that trains following may be safely controlled in accordance with stopping distances which are characteristic of the vehicles used in this system.

Figure 2:
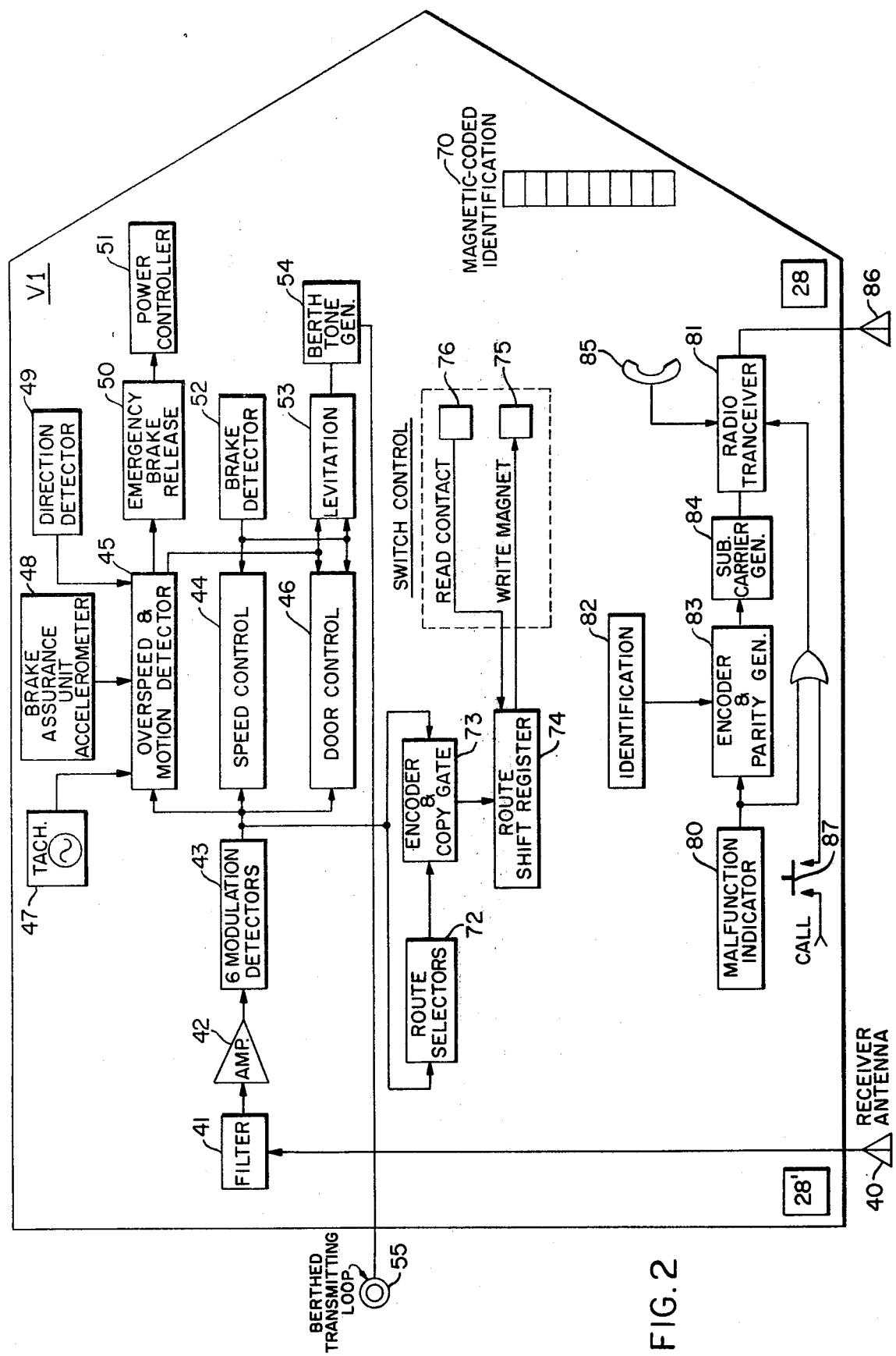
FIG. 2 is a diagram of vehicle carried control equipment.

Frequency signals generated by the speed selection unit 24 are communicated to the vehicle V1 over the loop 20 via receiver antenna 40 illustrated in FIG. 2. Filter 41 passes frequencies F1, F2, F3 and they are communicated through amplifier 42 to modulation detector 43. The modulation detector 43 is capable of picking out the speed limit and command signals and energizing relays in accordance with the transmitted signals for energized inputs to speed control 44 which governs the running speed of the vehicle. Other signals including a modulation frequency for the door control 46 may also be transmitted through the antenna and decoded at 43 for operating the doors in accordance with the proper positioning of the vehicle at a station platform.

Overspeed and motion detector 45 is responsive to the modulation detector 43 for holding off emergency brake release 50 and the power controller 51. An input from tacnometer 47 compares the actual vehicle speed with the speed limit as detected by signals from the modulation detector 43. The emergency brake release 50 may be a mechanically actuated apparatus which holds off application of the emergency brakes in accordance with a signal from the overspeed and motion detector 45 if the speed limit signal is lower than the actual speed as determined by the tachometer 47. Power controller 51 is coupled to the emergency brake release and decouples motive power for the vehicle V1 when the emergency brakes are released so that the vehicle will come to a safe and rapid stop when an unsafe condition is detected. Direction detector 49 provides a signal to the motion detector 45 for assuring that the vehicle is travelling in the proper direction and the brake assurance unit accelerometer 48 provides a signal to the detector 45 for acknowledging that the vehicle is slowing down in accordance with a change in speed limit or speed command signals as provided through the detector 43.

The motion detector 45 signals a door control apparatus 46 for preventing their operation if the vehicle V1 is moving at the train platform. When the train is stopped, a holding brake detector 52 governing the door control 46 assures that the brakes have been applied. Inputs from the brake detector 52 and the motion detector 45 are transmitted to levitation control 53 which deleviates the car V1 at the station platform. The levitation of the vehicle may be an air bag susspension or an air cushion system, but for purposes of this discussion it is important to note only that it is necessary to align the vehicle V1 with the station platform longitudinally within the limits of a berthing loop 60 on the wayside (see FIG. 3) and also level with respect to the station platform. When leveling is complete, the signal is communicated to berth tone generator 54 which produces a distinctive tone for transmission at its output loop 55.

A berthing loop 60 located mainly at the station platforms or docking areas receives a signal from the berth transmitting loop 55 if the vehicle V1 has stopped within the confines of the loop 60. A signal from the transmitting loop 55 is fed through filter 64 detector 65 and level detector 66 before a door open command may be provided to the command selector 67. These constraints assure first that the vehicle has stopped, the brakes have been applied, the vehicle is level with respect to the train platform and finally that the vehicle V1 has stopped within the proper confines of the berthing loop 60. When a door open command is initiated, the command selector 67 provides a signal to amplifier 68 for opening the doors, this signal is received at antenna 40 and filtered at 41 amplified at 42 and decoded in the demodulator 43. The door open command which would be some distinctive frequency is transmitted to door control 46 for actuating the vehicle doors. It should be noted as stated with respect to FIG. 3 that the occupancy sensor 61 and occupancy detector 62 must key the OR gate 63 so that the amplifier 68 is capable of transmitting the command signal for a door open designation to the vehicle.

After a selected dwell time as determined by the central control unit, a signal from control is coupled to command selector 67 for deactivating the door open command which essentially cuts off the distinctive door control frequency which is transmitted over the loop 60 to the vehicle V1. The doors on the vehicle then close in accordance with the cessation of the door open command signals and if the vehicle doors properly close, levitation control 53 is apprised of this condition and actuates apparatus for raising the car to its operative position. The brakes of the vehicle are also released in this sequence and when brake release is detected, speed control 44 is conditioned for accepting signals from the wayside for proceeding to the next scheduled stop.

Figure 3:
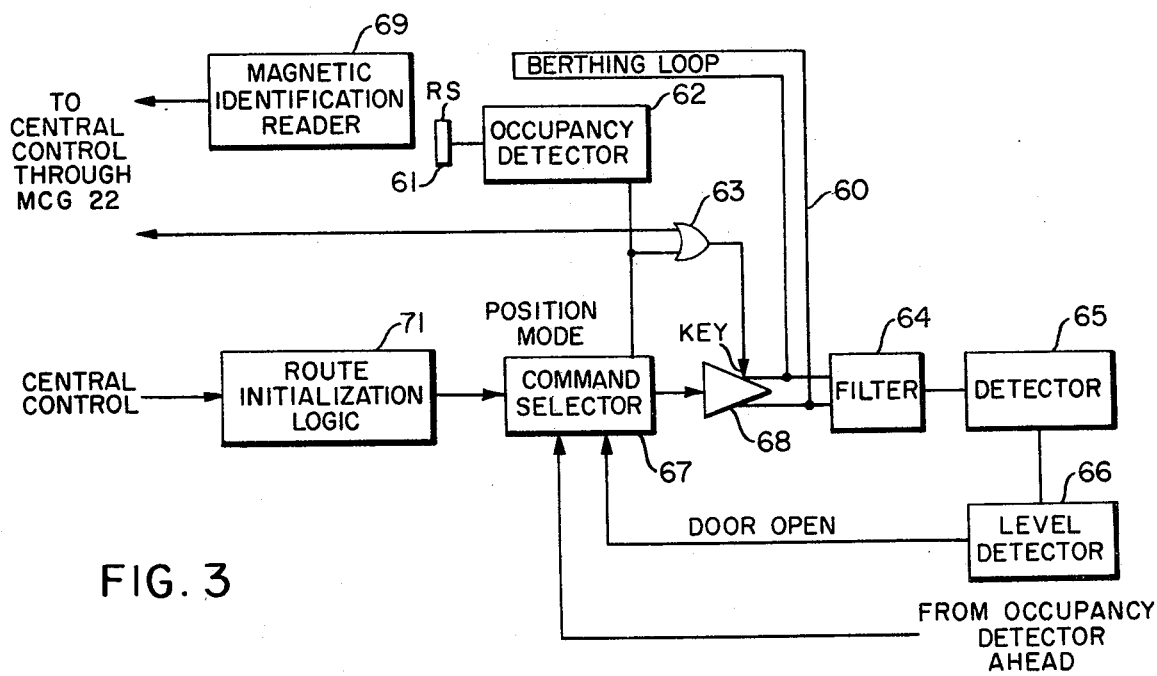
FIG. 3 is a diagram of wayside equipment used in conjunction with the vehicle carried control equipment.

As described with reference to FIG. 3 in accordance with the occupancy of the blocks ahead of the vehicle V1 command speed selector 67 provides signals to the vehicle through the amplifier 68 and loop 60 for starting up in accordance with the signals from central control.

At certain platforms along the route, magnetic identification readers 69 are installed. These readers generate signals for the central control in accordance with a magnetic coded identification card located on the vehicle V1 shown at reference 70. The reader 69 signal to the central control unit identifies the vehicle and the central control through route initilization logic 71 determines the route of the vehicle. Each vehicle is initilized at only one station on the route. The route selection may be made manually by pre-programming the desired route of the vehicles for all cases, or by perhaps a fare card or some other device for requesting a vehicle for a specific destination when a passenger enters the platform. Once however the destination of the vehicle is determined, the initilization logic generates signals to the command selector 67 for transmission to the vehicle through the loop 60. These commands drive route selectors 72 on the vehicle which energize certain outputs to be transmitted to encoder and copy gate 73. The encoder and copy gate places the information in digital form for setting up the individual stages of a route shift register 74.

The central control unit is programmed to recognize when a specific train should be initilized. That is, the magnetic identification card reader 69 picks up car identity from the card 70 on the vehicle and if this vehicle is recognized as one which should be initilized at the particular stop, the central control provides a signal to route initilization logic 71 which activates command selector 67 for changing the door control signal to a different frequency, which frequency is capable of activating the door control 46 on the vehicle V1 and also activating the encoder and copy gate 73 on the vehicle for providing a clear signal to the route shift register 74. In other words, route initialization is a clearing of the shift register 74 and a re-programming of the register 74 in accordance with the new route selected. As the vehicle proceeds along the guideway GW in approach of diverge switches, there are appropriately located sensors 75A directly coupled to the switch which respond to the condition as exists on the last stage of the route shift register 74. That is, a write magnet 75 located on the vehicle exhibits the condition of this last stage of the shift register 74; a ONE for example indicating a normal condition command and a ZERO indicating a reverse condition command for the switch. As the vehicle passes over the sensors 75A located along the guideway for the associated switch, the switch assumes the condition as demanded by the binary ONE or ZERO state of the write magnet 75. A read contact 76 carried on the vehicle is also sensitive to apparatus on the wayside 76A which indicates the approach of a switch and as the vehicle approaches the next switch, and reed contact reacts to shift the route shift register one place as it passes the apparatus 76A. By this means the stages in the route shift register 74 are advanced for enabling the write magnet 75 to activate each subsequent switch properly in accordance with the selected route transmitted from the central location at the initilization stop for that vehicle.

A malfunction indicator 80 is sensitive to various conditions on the vehicle. This indicator may transmit primary and secondary malfunctions which are respectively those malfunctions which require immediate correction or maintenance at a later time. This malfunction information is transmitted to radio transceiver 81 for communication with the wayside. Identification information is provided by identification means 82 which information is encoded at encoder and parity generator 83. This device encodes the information and checks parity for assuring that information transmitted is properly encoded. Sub-carrier generator 84 provides a distinctive frequency signal for transmitting malfunction and communication information. The phone receiver 85 is included so that passengers may communicate with the central control area by telephone in the event of a malfunction which goes undetected or some other emergency. This malfunction information is transmitted similarly to the wayside over antenna 86 which is capable of carrying a two-way communication to the radio transceiver 81. A call button 87 is provided to activate the radio transceiver for communicating with the wayside.

Figure 4:
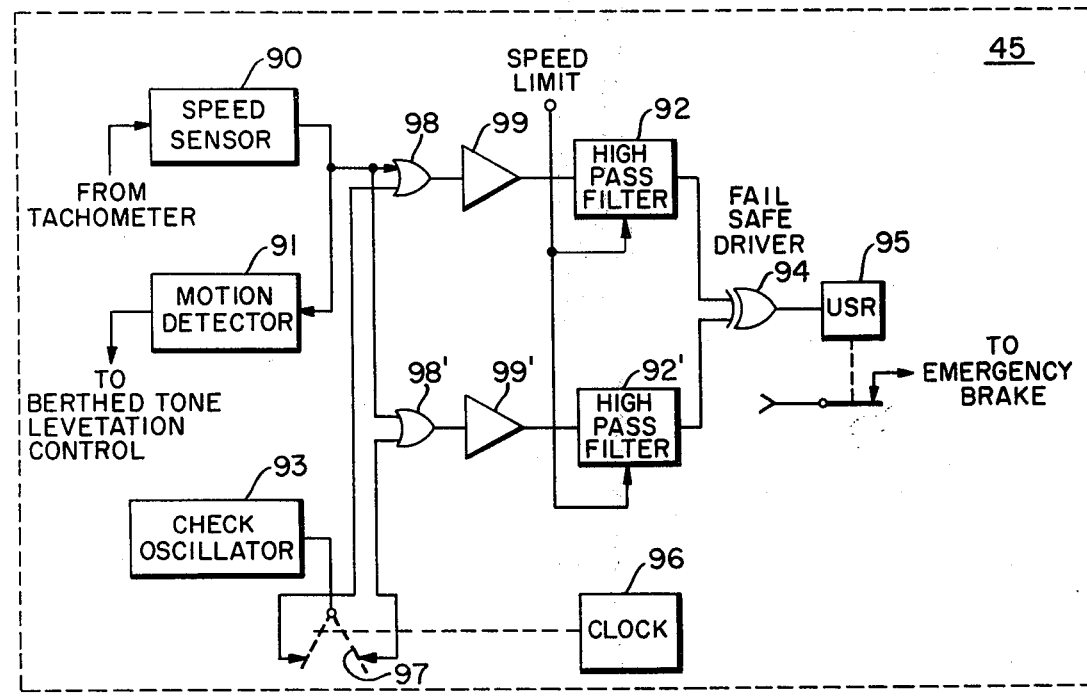
FIG. 4 is a detail of the overspeed and motion detector from FIG. 2.

The overspeed and motion detector 45 shown in FIG. 2 is illustrated in detail in FIG. 4. Its function is to allow the vehicle V1 to proceed if its speed is below the authorized speed limit and to envoke irrevocable emergency stopping if the vehicle exceeds the limit or if any circuit in the overspeed and motion detector fails.

A speed sensor 90 generates a signal indicative of actual vehicle speed in accordance with signals from the tachometer 47 which produces electrical pulses at a rate proportional to the speed of a notched wheel or gear in the propulsion system. The integrity of the speed sensor is checked by the motion detector circuit 91, which must indicate the motion of the vehicle a fraction of a second after power is applied to the propulsion system. After the vehicle has stopped at a station, the same circuit must show no motion for a period of time before the doors are allowed to open.

Pulses from the speed sensor 90 occur at a frequency proportional to speed. These pulses after amplification and shaping are fed through a high-pass filter 92. The cutoff frequency of the filter 92 is selected by the speed limit signals received from the demodulator 43. If the vehicle is not overspeed, the speed sensor pulses 90 do not pass through the filter 92.

Because the blocks in the system are relatively short, that is, approximately 80 feet, and in some cases half that length, it is necessary to detect an overspeed condition substantially instantaneously. For this reason a check is installed in the overspeed and motion detector 45 for accomplishing this end. A check oscillator 93 produces a signal at a frequency corresponding to a simulated overspeeding vehicle. This signal is applied periodically to the high pass filter 92. If the vehicle V1 is not overspeed the filter 92 produces an output which is pulsed at the rate at which the check oscillator is applied to the filter. This pulsing output is applied to a fail-safe driver 94 which holds up the underspeed relay 95. If the vehicle is overspeed, however, the output of the filter 92 is steady state; that is, DC or no pulses. If the oscillator 93 fails or if the filter 92 fails, the output is zero or steady state, depending upon the vehicle speed. Speed comparison circuits are provided in duplicate with one circuit checking the vehicle speed while the other is undergoing a safety check. A clock 96 operates contact 97 for alternating the safety check between two circuits several times per second. The use of two circuits as shown, including the high pass filter 92', minimizes the response time of the overspeed and motion detector 45 because there is no dead time required by the safety check. The inputs to the circuit must alternate between two states continuously in order to keep the underspeed relay 95 energized. These two states are (1) one circuit showing an underspeed condition and second circuit showing an overspeed and (2) the second circuit showing underspeed and the first circuit showing overspeed. Failure to satisfy either one of these conditions releases the underspeed relay 95 immediately.

The sequence of events for the operation of the overspeed and motion detector 45 follows. Speed sensor pulses 90 are provided first to OR gate 98 and amplified at 99 for an input to the high-pass filter 92. If the vehicle is not overspeed the speed sensor pulses are not passed through the high-pass filter 92 to the fail-safe driver 95. However, at the same time that pulses are being introduced to the high-pass filter 92 check oscillator 93 has a contact 97 connected to the input of OR gate 98 for producing the simulated high speed vehicle signal so that the pulses from the check oscillator 93 are passed through the high-pass filter 92 and pulse the fail-safe relay driver 94 at a rate proportional to the simulated high speed vehicle. An input from the speed sensor 90 is also provided to OR gate 98' and amplified at 99' from high pass filter 92'. If the vehicle is not overspeed these pulses do not pass the high pass filter and that input for the fail-safe driver 94 is not energized. When the clock 96 switches contact 97 to the right the check oscillator 93 pulses are imposed on the input to OR gate 98' and passed through high pass filter 92' to the driver 94 which the driver 94 secs as a proper input because its other input has been removed. As the clock 96 alternates the position of contact 97 signals are alternately produced on the two input leads of the driver 94 for maintaining the energized condition of the underspeed relay 95.

It should be noted that if the train stops the output of the speed sensor 90 indicates this condition to the motion detector 91 and also to the inputs of OR gates 98, 98'. However check oscillator 93 continues to produce pulses and clock 96 provides the switching necessary to produce alternate inputs on the fail-safe driver 94 for maintaining relay 95.

This system therefore provides continuous checking on the operability of the overspeed and motion detector 45 so that if an overspeed condition exists it will be detected without any substantial delay so that the vehicle can be brought to a safe stop as quickly as possible.

The Fail-Safe Driver 94 used in the preferred embodiment is an EXCLUSIVE OR circuit which, in order to produce a proper output for holding underspeed relay 95 energized, must receive one input only on one or the other input leads at a time. If the system is pulsing the input to the Driver 94 alternately and not simulataneously, the Driver 94 provides the output for holding relay 95 energized in accordance with the safe operation desired.

The speed limit signals and speed command signals transmitted to the train described previously as combinations of F1, F2 and F3 serve as inputs to two subsystems for the vehicle control. One of the systems is the automatic vehicle operation (AVO) and the other provides for automatic vehicle protection (AVP). Automatic vehicle operation could mainly be considered to be the function of the speed control apparatus 44 shown on FIG. 2. The peripheral equipment including brake detention, levitation and overspeed detector 45 would be considered to be part of the automatic vehicle protection system. The AVO sub-system provides the functions of smooth acceleration of the train to the running speed, regulation of that speed, control of train speed for change of speed limits, and bringing the train to a smooth stop. The AVP sub-system on the other hand functions to enforce the safe speed limit. The safe speed limit is based upon the extent of a clear guideway and on civil speed restrictions. The actual vehicle speed is measured and compared with the maximum safe speed limit permitted in that block. When the measured speed exceeds the safe speed limit the train will be brought to a safe stop.

The present system is designed to require that in order for a train to travel at the maximum speed limit, that is, that designated by AVP in FIG. 5, there must be at least four clear blocks in advance of the vehicle. In the example when a train is in block A, and blocks B, C, D and E are unoccupied, the train will receive a high speed command to both the automatic vehicle protection and automatic vehicle operation subsystems. The stable below shows the form of speed commands and speed limits that are permitted to be transmitted to block A, depending upon the number of clear blocks ahead of vehicle A.

| Number of Clear Blocks Ahead | AVP (Speed Limit) | AVO (Speed Command) |
|---|---|---|
| 4 | H | H |
| 3 | H | M |
| 2 | H | M |
| 1 | M | O |

As long as there are four clear blocks ahead a train may proceed at maximum speed in areas where there are no civil speed restrictions. Vehicle protection is achieved by limiting the train speed limit as the number of clear blocks ahead decreases. In the example shown in FIG. 5, if a vehicle VG is occupying block G, the following train or vehicle VA occupying block A receives an H/H speed command which means that the speed limit is the maximum and the command speed is the maximum. This is because there are four clear blocks ahead of the vehicle VA. When the vehicle VA enters block B it receives an H/M speed command. This is in accordance with the table above because there are only three clear blocks ahead. The speed command is lowered so that the train will begin to reduce speed. However, the speed limit is still kept at high because the train, if placed in an emergency brake mode, can stop before it reaches vehicle VG. If block G remains occupied no change in speed command occurs as the train VA proceeds through block C. It should be noted that two blocks are required to guaranty that the automatic vehicle operation sub-system will reduce the train speed from high to medium. However, it also should be noted that two blocks are required to reduce the vehicle speed from high to zero in an emergency stop mode so that if the vehicle VA enters block D at high speed it will immediately be placed in an emergency stop mode so that it will stop before it enters block G, thereby protecting the rear of vehicle VG.

Certain absolute distances are required to stop a vehicle from certain speeds or to gradually reduce the speed of the vehicle from one operating speed to another. FIG. 6 illustrates that under normal conditions, assuming an average block length of 80 feet, it takes two blocks (distance S1) to reduce the speed of the vehicle from high to medium using the control system 44 of FIG. 2, to slow the vehicle down gradually. However, if an emergency brake mode operation were put into effect it would take two blocks (distance S3) to reduce the speed of the vehicle from high to zero. On the other hand, it takes approximately one block (S2) for the automatic train operation sub-system to reduce the speed from medium to zero under normal conditions. It requires the same amount of distance (S4) to reduce the speed from medium to zero under emergency brake conditions. The constraints therefore, placed upon the system are mainly dependent upon the safe stopping distances under emergency and normal braking conditions.

Each of the speed selection units 24 shown in FIGS. 1A-1B select both the command and speed limit controls for communicating to a vehicle occupying its associated block in accordance with the traffic conditions in advance of the block. The speed selection units 24 are effective to select a relatively low command speed control for each block in accordance with the traffic conditions in advance of the block. The speed selection units 24 are effective to select a relatively low command speed control for each block in accordance with the selection of a low speed limit control for at least one block in advance of the vehicle. In other words, the speed command of the AVO sub-system for block B of FIG. 5 is designated at high, which is no greater than the speed limit for the next succeeding block C. The speed control signal for block C, on the other hand, is medium which again is no higher than the speed limit for block D which is high. The speed command for block D is medium, while the speed limit for block E is medium. The system is designed, therefore, to render a speed command signal to a block at no greater than the allowable speed limit for the next succeeding block. The use of speed limits and speed commands provides versatility to the system and permits generally smooth running auto-matic operation without the probability of run-over from one block to the next succeeding block in excess of the speed limits.

The brake assurance unit accelerometer 48 shown in FIG. 2 is included in order to provide an acknowledgement of the fact that a lower speed command has been received and is being implemented; that is, if the vehicle VA enters block C of FIG. 5 and vehicle VG remains in block G then only three clear blocks exist in advance of vehicle VA and the speed control signal changes from high to medium. The brake assurance unit in accelerometer 48 acknowledges the declaration of the vehicle as it begins to lower speed from high to medium. If the vehicle VA enters block D and VG remains as is only two clear blocks remain ahead of vehicle VA. The speed limit may be high and the speed command remains at medium because the vehicle can slow from a medium speed to zero within two blocks and the rear of train vehicle VG is still protected. However, if vehicle VA enters block E at a speed greater than the medium speed, the vehicle VA will immediately go into an irrevocable emergency braking situation, because it takes two blocks to stop the train from high to zero in emergency braking situation, because it takes two blocks to stop the train from high to zero in emergency braking to protect vehicle VG. The brake assurance unit and accelerometer 48 may be incorporated into the system to prevent an emergency braking mode by detecting the deceleration of the vehicle and checking the operability of the brakes for slowing the vehicle down gradually from high to medium. If the unit detects that the brakes are not operating properly or that the vehicle is not decelerating in accordance with the application of the brakes then the emergency braking may be applied. It should be noted that the brake assurance unit and accelerometer is an added feature to the already safe operating system.

The implementation of the speed limit and speed command systems with respect to communications from the wayside to the vehicle is shown with reference to 7A-B-C. In addition there is also shown a check-in and check-out subsystem which provides fail-safe occupancy detection so that the number of clear blocks ahead of the vehicle may be accurately determined and if such accuracy is absent, occupancy will be indicated to prevent an unsafe condition.

Figure 7A:
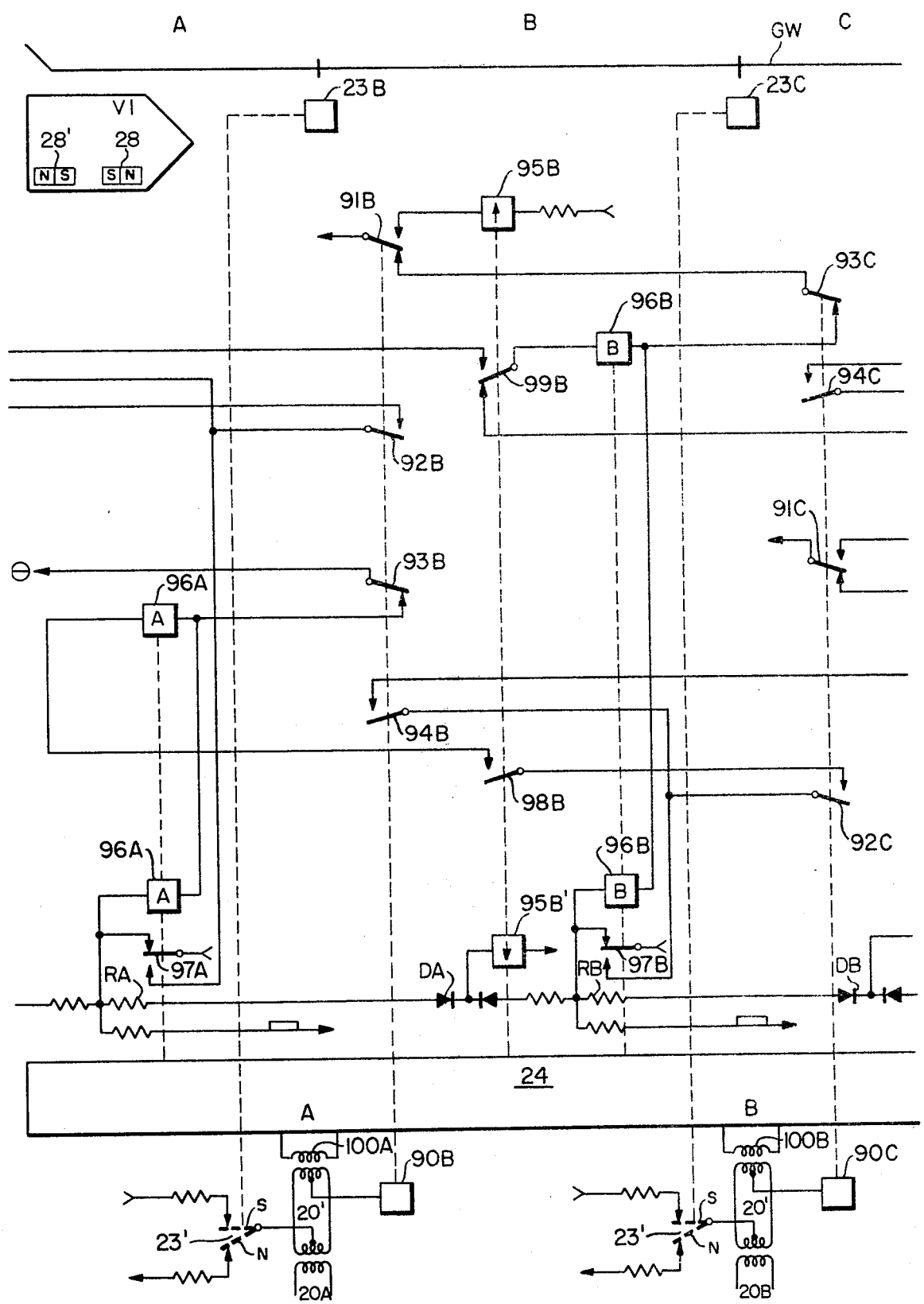
FIGS. 7A-B-C illustrate the check in-check out safety subsystem.
Figure 7B:
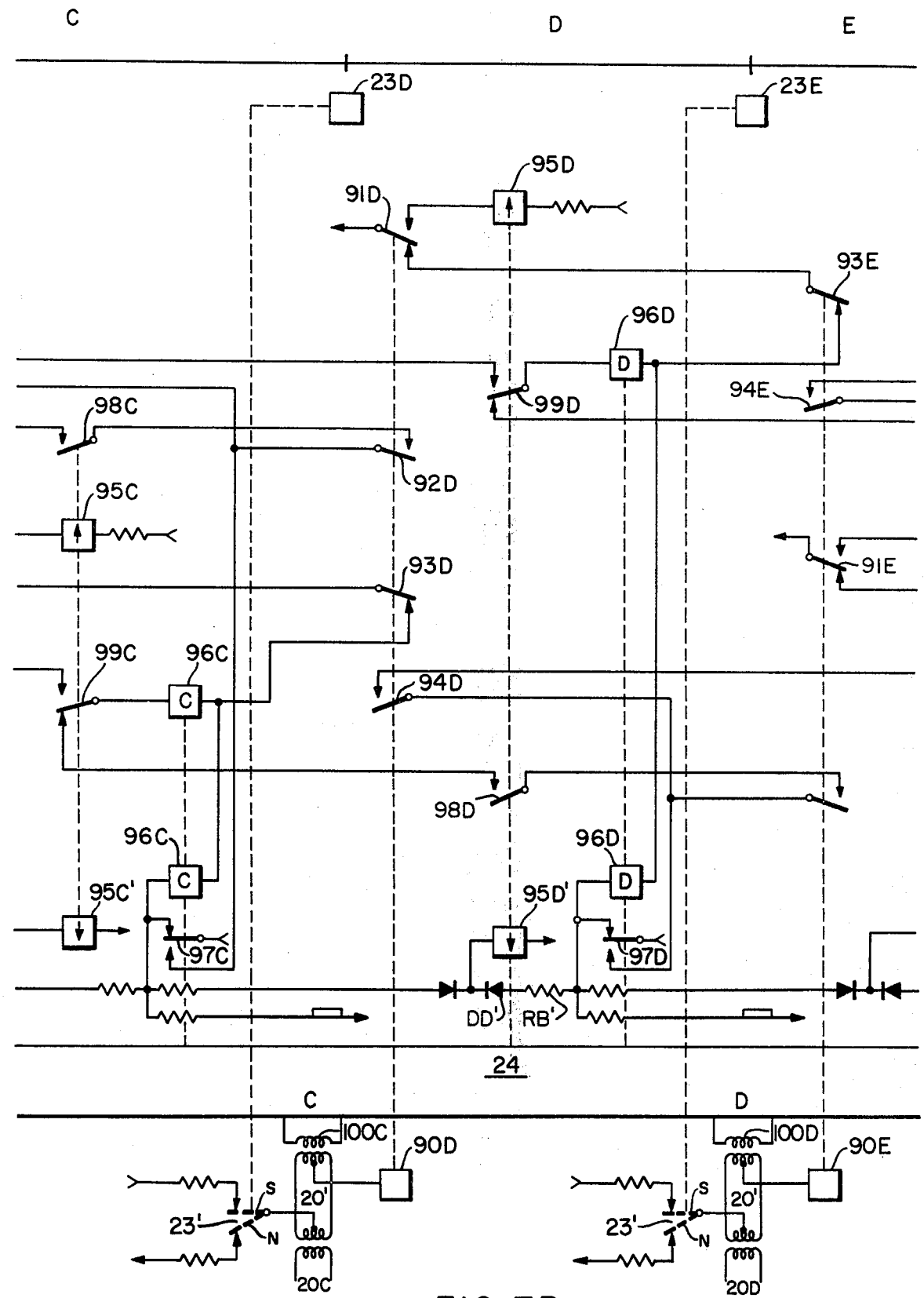
Figure 7C:
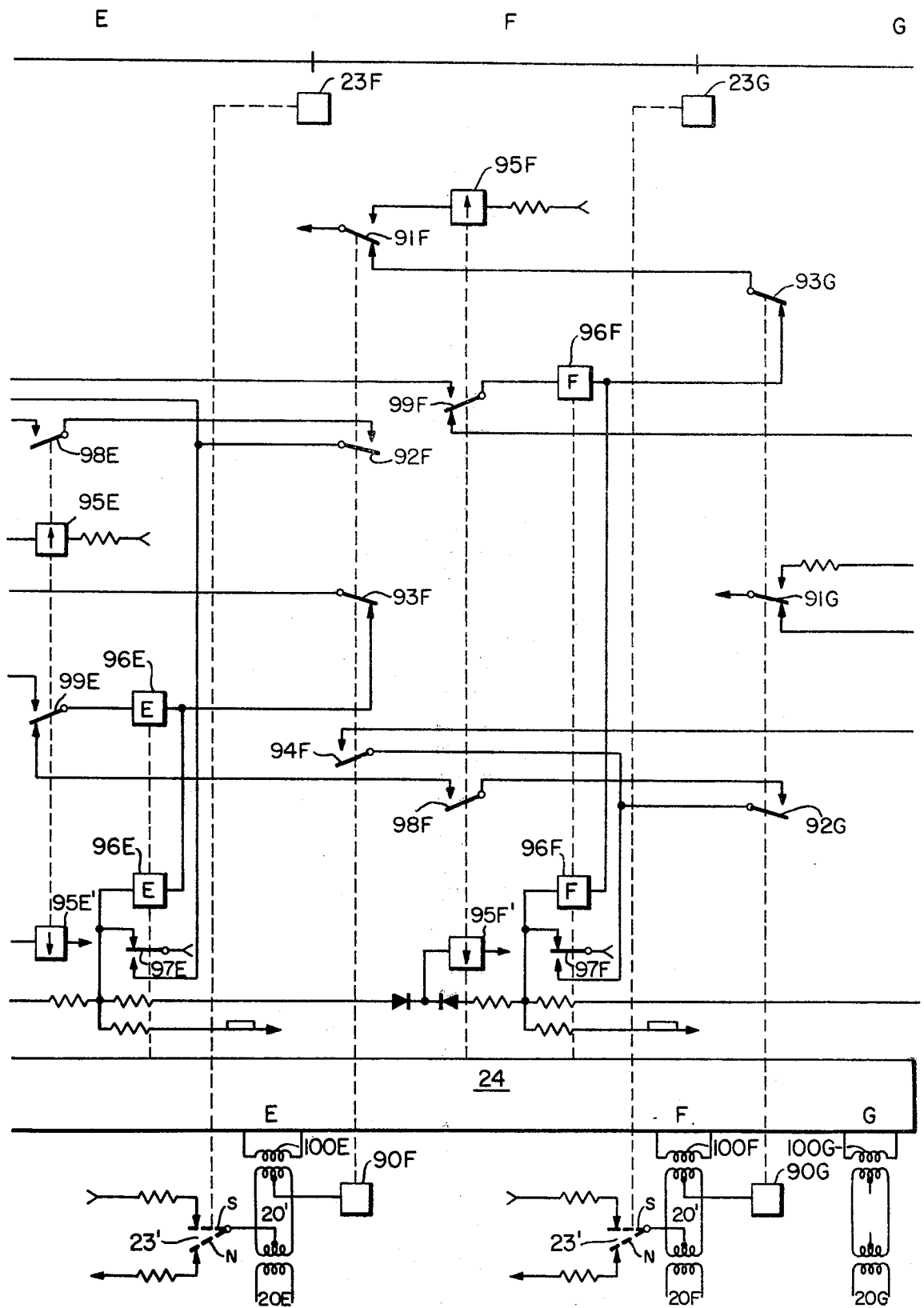

A section of guideway GW is shown in FIGS. 7A-B-C from blocks A through G. The occupancy sensors 23 shown in FIG. 1 are labeled similarly by reference numeral 23 with a letter designating the block which it shall be associated with. It should be understood that the sensors 23 are associated with the block in advance of the vehicle travelling from left to right. However, when the reverse direction is described later in the disclosure for purposes of convenience, the block sensor 23 shall be described with reference to an entering direction from left to right.

Each of the occupancy sensors 23 can be described as bistable switches which are actuated from one stable state to another by the north or south pole of a magnet. Vehicle V1 has mounted thereon magnetic actuators 28, 28', designating the front and rear of the vehicle respectively. The contact 23' shown controlled by bistable switch 23 has two possible positions, N and S, respectively, which represents the conditions of the bistable switches 23 when encountering a north or south pole.

As the vehicle passes over one of the bistable switches 23 a north pole encounters the switch and contact 23' remains down because it is normally in that position. As the south pole of the magnet 28 encounters the relay or bistable switch 23 it picks the relay up to the S position. The vehicle normally proceeds and as the south pole of magnet 28' encounters the contact 23' of the bistable switch 23 it remains in its up position however as the north end of magnet 28' encounters the bistable switch 23 it drives the contacts down to the N position. The condition of the bistable switch 23 is used to indicate occupancy for the block. However, it is obvious that once the vehicle passes by the bistable switch 23 completely the switch is in its N state as shown by contact 23' down.

When the vehicle enters block B, bistable switch 23B and its contact 23'B is picked with the south end of magnet 28 passes the bistable switch 23B. This places negative energy on a transformer link 20' between frequency selector network labelled generally as 24 and the wayside loop labelled 20B. The negative energy from that contact 23'B is transmitted to bistable repeater relay 90B shown in the lower left corner of the drawing. Relay 90B controls contacts 91B through 94D and this relay remains in its last actuated position in accordance with the condition of the sensor bistable switch 23B. When relay 90B is actuated or energized to the forward position it picks contacts 91B through 94B. When contact 90B is closed to its forward position it energizes relay 95B which is a polar biased relay which remains energized or stuck in its last energized position. There are two coils on this relay 95B designated 95B, 95B'. In order to drop relay 95B out energy must be supplied from a front contact 97A of relay 96A which shall be discussed further in the disclosure. Further, when relay contact 91B is picked to the front position, the back contact is open which causes an open circuit for relay 96B. Relay 96B remains de-energized until reset by the clearing of block B when a vehicle enters block D.

As the vehicle enters block C from block B relay 23C is picked up which causes its contacts 23'C to be closed to S, the forward position picking up relay 90C. Energization of relay 90C closes front contacts 91C through 94C which serve similar functions to those marked 91B through 94B for the previous block. Activation of relay 90C closes front contact 91C through 94 C which serve similar functions to those marked 91B through 94B for the previous block. Activation of relay 90C closes front contact 91C for picking relay 95C and dropping out relay 96C for indicating occupancy of block C. The crossing of the threshold or boundary between blocks B and C serves to reset occupancy block relay 96A for block A from positive energy through back contact 97B of relay 96B closed front contact 92C of relay 90C which is closed now because the vehicle is occupying the area above the sensor relay 23C and has not completed its transition by clearing its rear end out of block B and into block C, front contact 98B of relay 95B and upper coil of the relay 96A and back contact 93B of relay 90B to negative energy. The closing front contact 97A of relay 96A clears that block so that a vehicle may safely enter the block without going into an emergency brake mode. It should be noted that the vehicle has cleared out completely of block A, has checked into block B and also checked into block C before block A is cleared. When front contact 97A closes positive energy is supplied through contact 97A, resistor RA, diode DA, to the knock-down coil 95B' of relay 95B. This can be provided because the direction of the vehicle has been established by its check out of block A and check in to blocks B and C. As the vehicle proceeds to check completely into block C the same conditions exist as previously described for block A. In order to clear block B the vehicle V1 must check out of block B and into blocks C and D. As the vehicle V1 enters D the contacts 91D through 94D close, picking relay 95D and dropping relay 96D which indicates respectively direction and occupancy for the vehicle in block D. Relay 96B which indicates occupancy for block B is now cleared from positive energy through back contact 97C of relay 96C through closed front contact 92D, closed front contact 98C of relay 95C, back contact 99B of relay 95B, the upper coil of relay 96B, back contact 93C of relay 90C and back contact 91B of relay 90B. Picking relay 96B closes front contact 97B for supplying positive energy through resistor RB and diode DB and knock-down coil 95C' of relay 95C to negative.

In accordance with this description the vehicle V1 is now in a position over sensor 23D occupying back blocks D and C. If the vehicle were to reverse its direction at this point block D would have to be cleared. In addition, whenever a vehicle changes direction this condition must be detected so the vehicle is not lost. The last occupied block must be cleared so that vehicles following in that direction can enter the block without coming to an irrevocable emergency stop because of an uncleared block.

The vehicle V1, in order to clear block D, must proceed through block C into block B. Opening contact 93D would cause a de-energization of relay 96C, however, under the conditions set forth above since block C was previously occupied the relay 96C is already down. The vehicle V1 proceeds to the boundary CB and as it crosses the boundary sensor 23C activates contacts 23C' to the S position for picking relay 90C and opening contacts 91C through 94C. The relay D is cleared from positive energy through a circuit of back contact 97C to contact 94C of relay 90C, front contacts 99D of relay 95D, the upper coil of relay 96D, back contact 93E of relay 90E and back contact 91D of relay 90D to negative energy. When relay 96D closes front contact 97D the relay 96D' is picked through resistor RB' and diode DD'.

As the vehicle proceeds through block B and crosses the threshold or boundary into block A relay contacts 23B close the contact 23' to the N position energizing relay 90B which in turn causes contact 91B to close and pick up relay 95B. Relay 96C may now be reset from positive energy through relay contact 97B, contact 94B of relay 90B, front contact 99C of relay 95C, upper coil of relay 96C, relay contact 93D and back contact 91C of relay 90C to negative energy. From this it can be seen that no matter which direction the vehicle travels there will always exist one block behind the vehicle which indicates occupancy so that another vehicle cannot follow too closely to vehicle V1 travelling in the guideway, and regardless of direction the vehicle is always accounted for. If a failure occurs occupancy is indicated for safety.

Figure 8A:
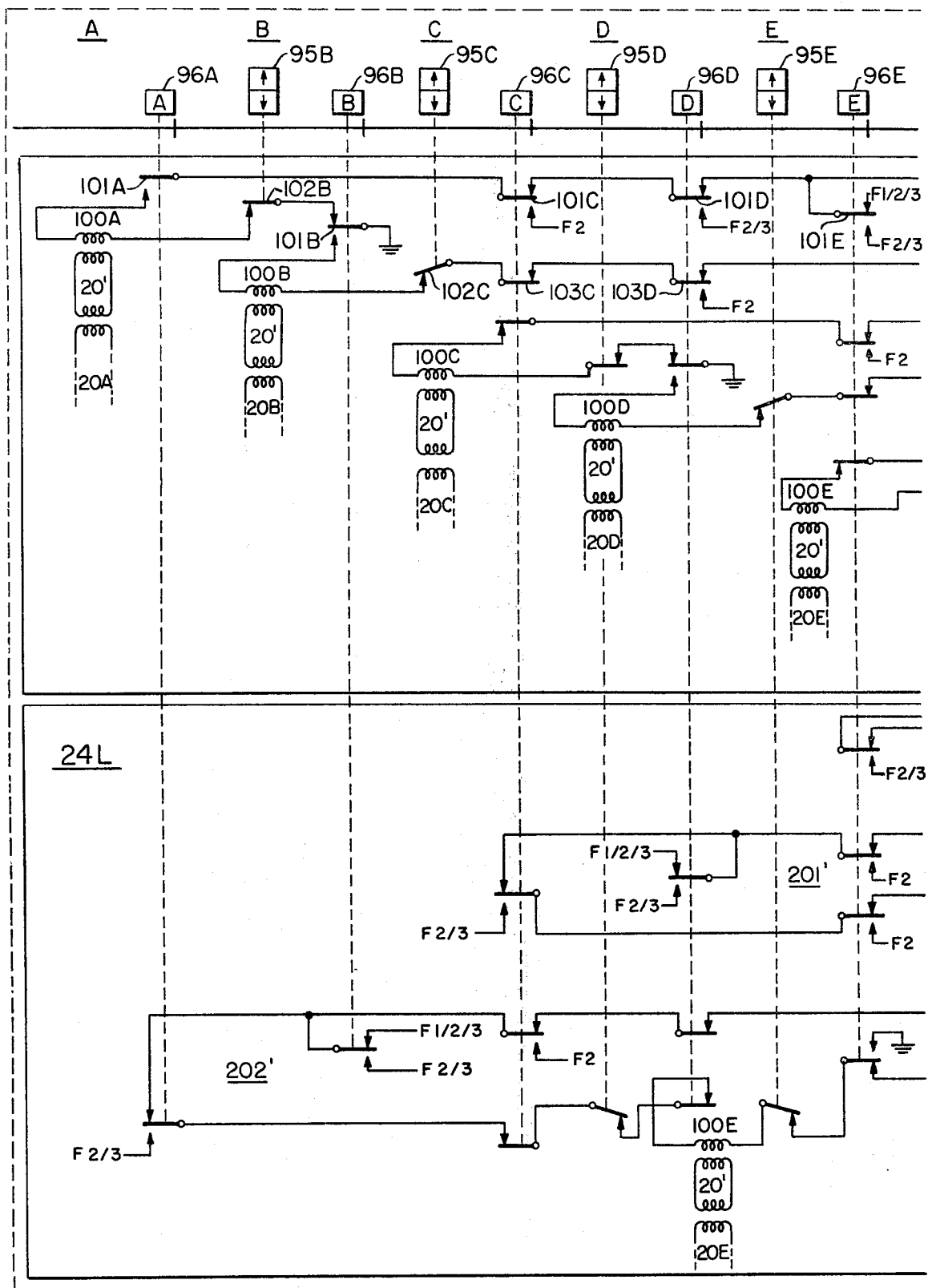
FIGS. 8A-B are further illustrations of apparatus shown in block form in FIG. 5.
Figure 8B:
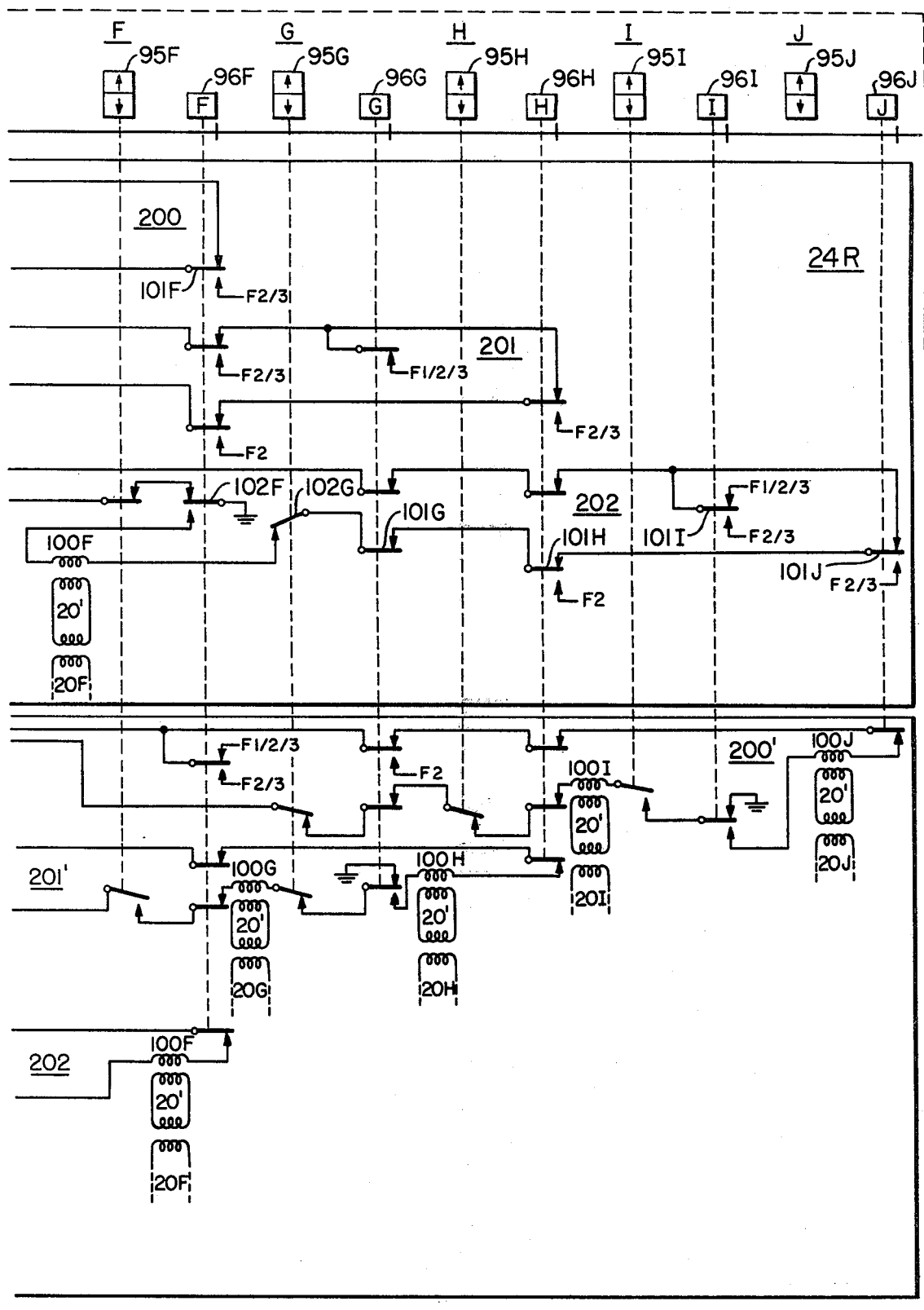

In order to implement the selection of code frequencies for the operation for speed selection as described previously, the speed selection network 24 of FIGS. 7A-B-C shown in detail with respect to FIGS. 8A-8B, is utilized to govern the speed selection for the system. The illustration shows the speed selection networks 24R and 24L which respectively designate the speed selection networks for vehicular traffic from left to right and right to left. Selection of either of the speed selection networks 24R or 24L may be provided by automatically or manually switching carrier input from one to the other. The transmission loop 20 for each section of guideway A through J is coupled to the speed selection networks 24R and 24L through coupling transformers 20'.

If the vehicle is present in Section A and the selected direction is left to right, a speed limit and speed command signal is coupled to loop 20A through primary 100A to coupling transformer 20'. If block A is occupied contact 101A of occupancy relay 96A is closed. If no other vehicles are present in the guideway within four blocks in advance of block A the vehicle receives a maximum speed limit and speed command from the speed selection sub-network 200 as follows. From front contact 101E of relay 96E frequencies F1, 2 and 3 are imposed on the line circuit through front contact of 101D of relay 96D which is energized because block D is empty, through contact 101C, relay 96C through contact 101A of relay 96A through the coupling transformer coil 100A for block A, back contact 102B of relay 95B to ground through front contact 101B of relay 96B. Back contact 102B is in this circuit because being a non-vital relay, it must be down before a train is allowed to proceed in Section A. If the vehicle moves into block B contact 102B and 101B open circuit because relays 95B and 96b are respectively energized and released indicating occupancy. Open back contact 102B removes energy from the line circuit for that portion of the speed selection network associated with Sec-tion A. Therefore no energy is transferred through primary 100A to the coupling transformer 20' to loop 20A so that if another vehicle enters block A from behind vehicle V1 it will receive no carrier signal and go into an immediate emergency brake application.

If, as yet, no other vehicles are ahead of vehicle V1 within four blocks of block B selection network 24 it will transmit a high speed limit and speed command to its associated loop 20B as follows: from ground through back contact 101B of now de-energized relay 96B, coupling coil 100B, back contact 102C of relay 95C, front contact 103C of relay 96C, front contact 103C of relay 96D, front contact 103D of relay 96D, front contact 101F of relay 96F, front contact 101E of relay 96E wherein it receives frequencies F1, 2 and 3. If a vehicle were present in block F, however, contact 101F would be in its back position wherein only frequencies F2 and F3 would be transmitted through back contact 101F, through front contact 103D, front contact 103C, back contact 102C, coil 100B and back contact 101B to ground. It can be seen from this that if block F is occupied, only three clear blocks exist between blocks L and block F and the speed limit and speed command are respectively high and medium corresponding to a speed selection signals F2 and F3.

The speed selection sub-networks 200', 201' and 202' of speed selection network 24L operate precisely in the same manner as that shown for speed selection network 24R except signals are transmitted in advance of vehicles moving from right to left.

Speed selection sub-networks 201 and 202 operate precisely in the same manner as described for the sub-network 201 except that they read ahead to blocks F through J. If vehicles occupy blocks F and I, respectively, the speed commands and speed limit signals appearing at coil 100F of selection sub-network 202 are High-Medium corresponding to the F2, F3 signal from back contact 101I, front contact 101J, front contact 101H, front contact 101G, back contact 102G, coil 101F, back contact 102 F of occupied block F to 100F, ground. Assuming no train or vehicles are in advance of block I by at least four blocks, coil 100H (not shown) feeds the loop 20H (not shown), and receives an F1, 2, 3 signal corresponding to a high speed limit, high speed command.

Figure 9:
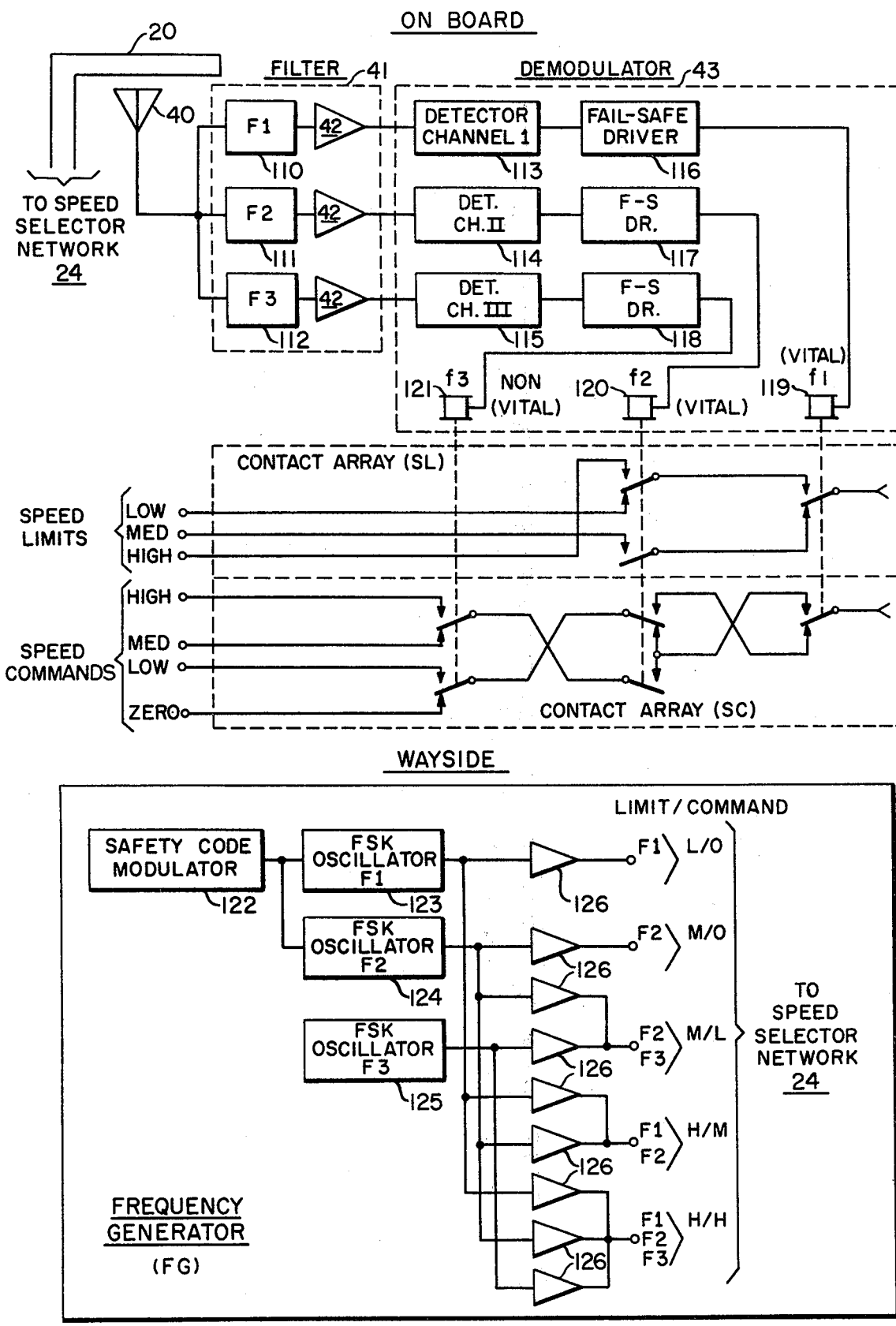
FIG. 9 is a drawing showing means to communicate speed limit and speed controls from the wayside to the vehicles.

FIG. 9 shows an arrangement for generating the control frequencies F1, 2 and 3, which are coupled to the speed selection networks 24 for transmission over the loop 20 for the associated block. The drawing shows some wayside apparatus including the frequency generator FG and on-board equipment including the receiver antenna 40 for the filter 41, demodulator 43 and contact arrays SL and SC which provide respectively speed limits and speed command frequencies.

A safety code modulator 122 governs the operation of frequency shift oscillators for F1 and F2, 123 and 124, respectively. A combination of the safety code modulator 122 and the frequency shift code oscillators 123 and 124 provide a fail-safe generator for the safety aspects of the system. An oscillator 125 generates the code rate for F3 which is non-vital because the speed limit command frequencies are more restrictive in their aspects. The signals are coupled to amplifiers 126 in the manner shown in the drawing in the frequency generator FG for producing the speed limit and speed command signals appropriately for the respective outputs. The outputs of the frequency generator are connected or coupled to the speed selection networks 24R and 24L as described with respect to FIG. 8A-B and those signals are transmitted to the loop 20 for coupling with receiver antenna 40 on the vehicle.

Filter 41 separates the frequencies F1, 2 and 3 in filter receivers 110, 111 and 112 respectively. The amplifiers 42 raise the level of the signals and demodulator 43 includes detector channels (I, II, III) 113, 114 and 115 for the frequencies F1, 2 and 3 for transmission to the respective fail-safe drivers 116, 117 and 118. These drivers respectively operate relays 119, 120 and 121 for frequencies F1, F2 and F3. The relay 121 need not be fail-safe as previously noted because of the more restrictive aspects of the F1 and F2 signals. Contact arrays SL and SC are shown as governed by the relays 119, 120 and 121. The contact array SL provides the speed limit outputs to speed control 44, and overspeed and motion detector 45 for operating the vehicle in the manner previously described. The contact array SC provides speed commands to the speed control 44 for the normal running conditions of the vehicle. It can be seen from the drawings of FIG. 9 that energization of the relays 119 and 120 provide only three speed limit commands as previously described and that the relays 119, 120 and 121 produce four signals for the various aspects of the speed command signals. This illustration therefore when taken in conjunction with the previous description of the preferred embodiment of this invention illustrates the manner in which the signals are generated, communicated to the vehicle and demodulated by the vehicle for operation thereof.

Figure 10A:
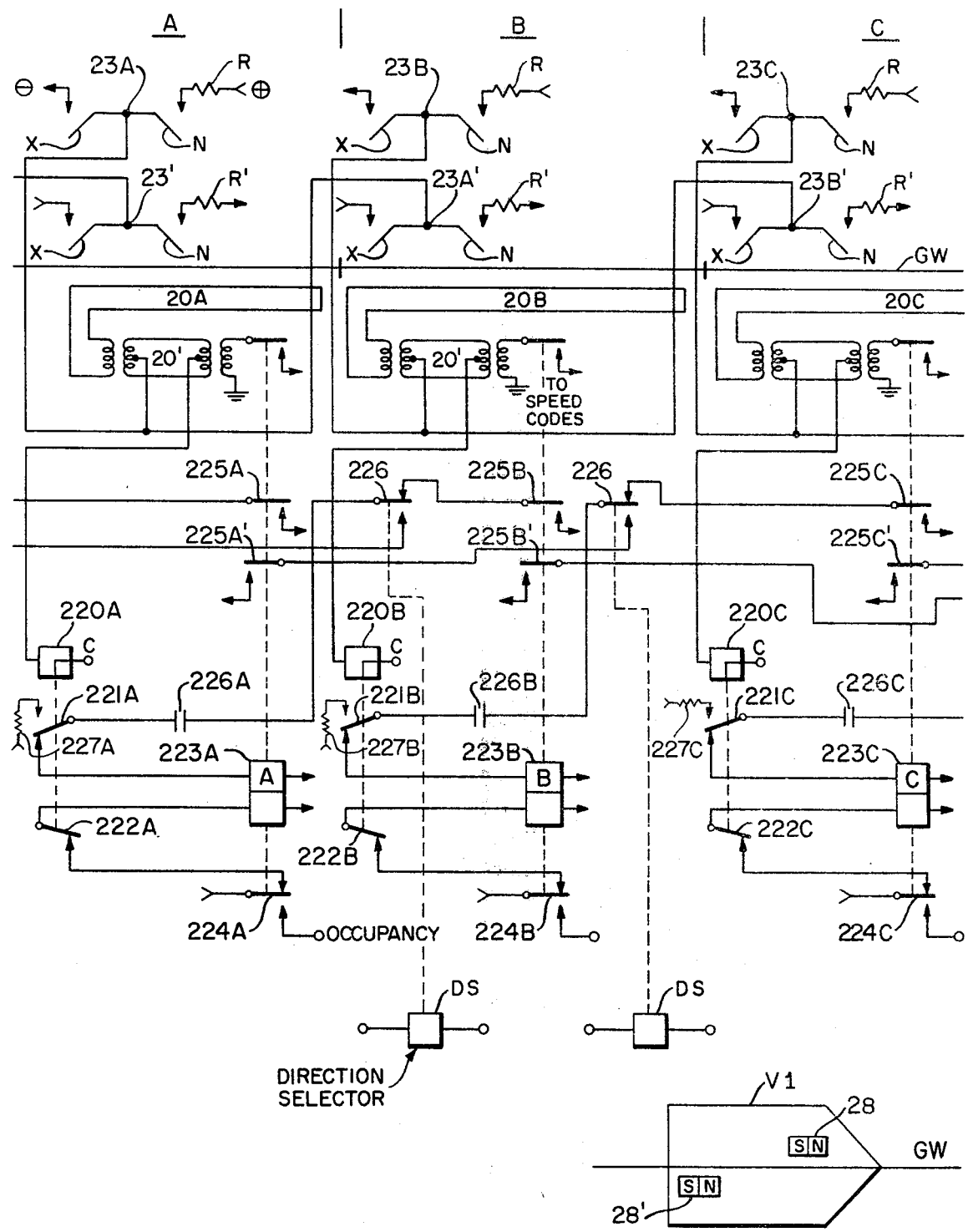
FIGS. 10A-B show an alternate embodiment of a check in-check out system.
Figure 10B:
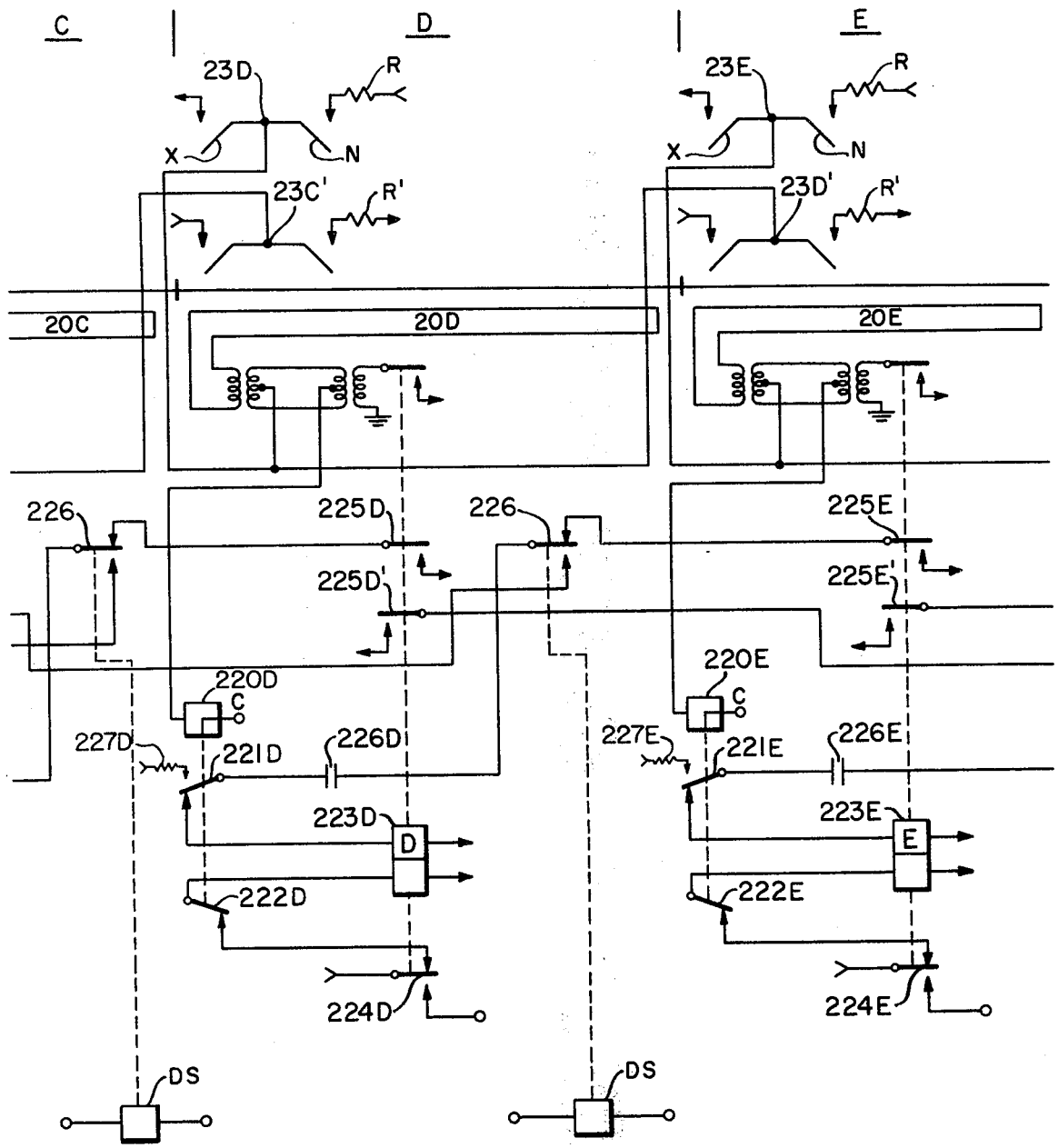

FIGS. 10A-10B show another embodiment of the check-in and check-out systems of the present invention. The vehicle V1 travelling in the guideway GW has magnetic actuator 28, 28' located so as to cooperate with reed switches 23 and 23'. For movement from left to right the reed switches 23A through 23E are used to activate sensor relays 220A through L. Switches 23' are activated by the magnetic actuator 28' and are produced for picking the relays 220A through L when the vehicle is travelling from right to left. In addition, the combination, for example, of 23B and 23B' provides for the check-in, check-out of the vehicle; that is the magnetic actuator 28 picks the N and X contacts of sensor switch 23B and the magnetic actuator 28' picks the N and X contacts for 23B' as the rear of the vehicle checks into block C. The north pole of the magnet 28 or 28' picks the N and X contacts and the south pole of the magnet 28 or 28' knocks down the contacts of the detector switch 23'. The contacts are labelled N and X to indicate respectively entering and exiting functions for the contacts. That is, an N contact of any of the switches 23 or 23' is picked the associated relay 220 is energized from positive energy through the resistor R, contact N and through the simplex circuit of transformer coil 20' to the coil of relay 220 for picking its contacts 221 and 222. When the south pole of the magnet 28 passes over the X contact relay 220 may be de-energized from negative energy through contact X over the simplex circuit through the transformer coil 20' to the coil relay 220. In this embodiment therefore the short pulse introduced by the closure of contacts N or X, respectively, knocks down and picks up the relay 220. The relay 220 is a polarity sensitive stick relay which is caused to pick up by positive energy and driven down by negative energy and it remains in this last energized position until it receives energy again. Energization of relay 220A picks contacts 221A and opens the stick circuit for block relay 223A closing it to deergize for indicating occupancy over back contact 224A. When the front of the vehicle approaches the boundary between blocks A and B magnetic actuator 28 picks contact X of detector switch 23B which has no effect on the relay 220B because it is already de-energized. However, when the north pole of magnetic actuator 28 encounters contact N of detector switch 23B the contact N is picked and positive energy flowos through resistor R over the simplex circuit to energize relay 220B which opens back contacts 221B and 222B and de-energizes relay 223B for indicating occupancy for block B. This sequence charges capacitor 226B through closed front contact 221B. Relay 223B is energized through the discharge of capacitor 226B when relay 226B releases. Energy through resistor 227B must be applied to front contact 221B to charge the capacitor. If both contacts of relay 220B short relay 223B cannot pick up because the voltage drop across resistor 227B is too great. Capacitor 226B must charge to full voltage with front contact 221B closed and discharges to pick up relay 223B when its back contact is closed. The resistor 227B should be a fail safe of the spirally wire wound type. As the rear of the vehicle crosses the boundary between A and B, contact X of detector switch 23A' is closed but positive energy cannot affect the condition of relay 220A which is connected to the circuit for the previous block. However, when the north pole of magnetic actuator 28' encounters the N of switch detector switch 23A', negative energy is supplied through resistor R' over the simplex circuit for block A to knock down relay 220A and since the front of the vehicle has been detected in block B, contact 225B of block relay 223B is de-energized for supplying energy for charging capacitor 226A for energizing block relay 223A over closed back contact 221A for clearing block A as the rear of vehicle V1 crosses the boundary from A to B.

The circuit for clearing block A as described includes a contact 226 for each block which is controlled by a direction selector relay DS. When normal operation, from left to right, is desired the relays DS are energized and contacts 226 are closed to their front position so that when the vehicle enters the block to the right of the previous block contact 225 is de-energized and the circuit for energizing relay 223 for the previous block is complete over closed front contact 226. However, if the reverse running direction which is at the relay'ss DS are deenergized and contacts 226 are in their closed back positions for each block and the relay contacts 225A' through D' are utilized to energize the relays 223A through E, respectively, for the reverse direction. This embodiment does not permit reverse running of the vehicles without the changing of the position of direction selector relay DS because a vehicle may be lost if they change direction without the DS relay in its reverse position. This type of arrangement may be utilized where reverse running is not anticipated or permitted and checks may be provided for assuring that the vehicle does not change direction without proper authorization.

Figure 11A:
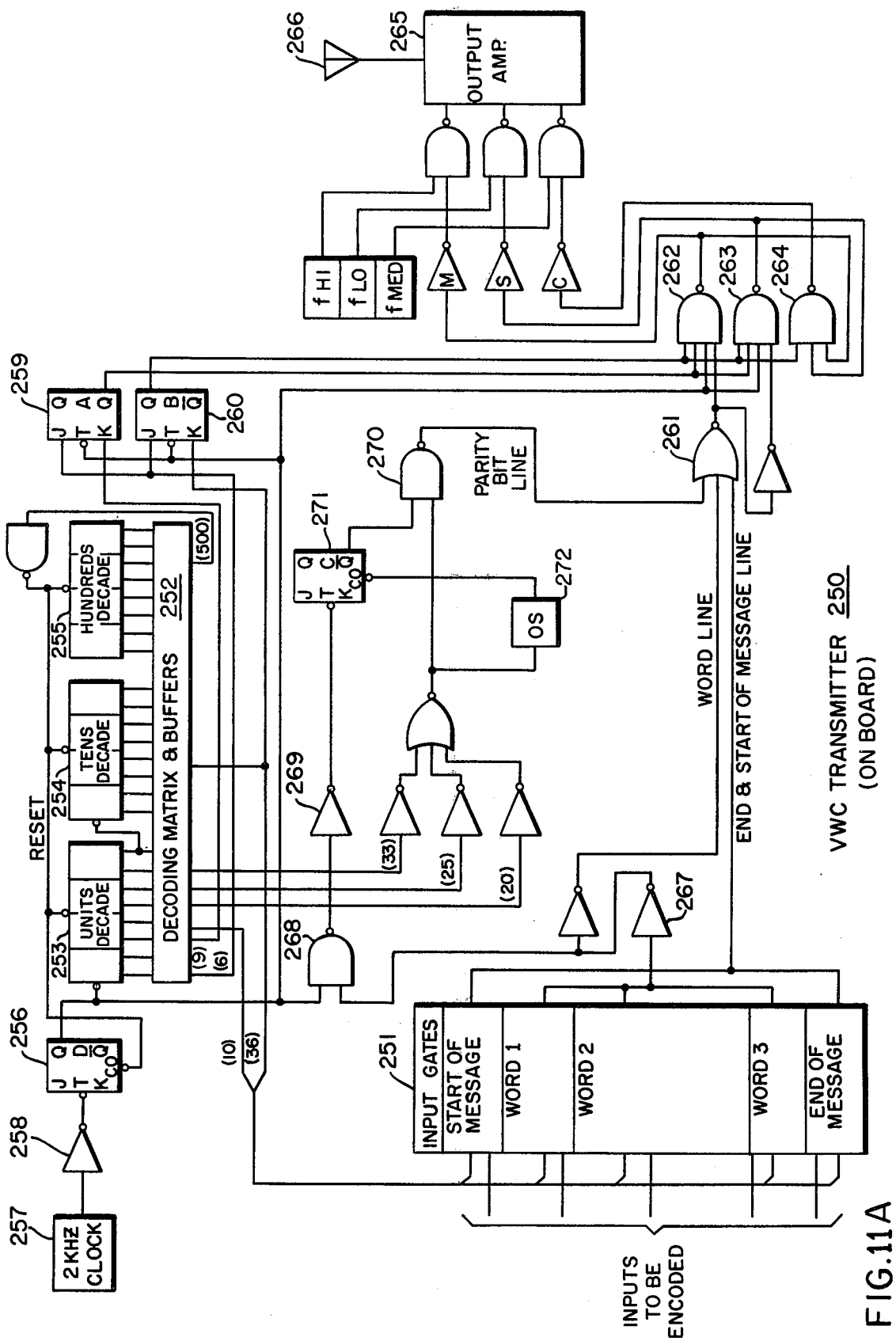
FIG. 11A is a drawing of vehicle to wayside transmission means.
Figure 11B:
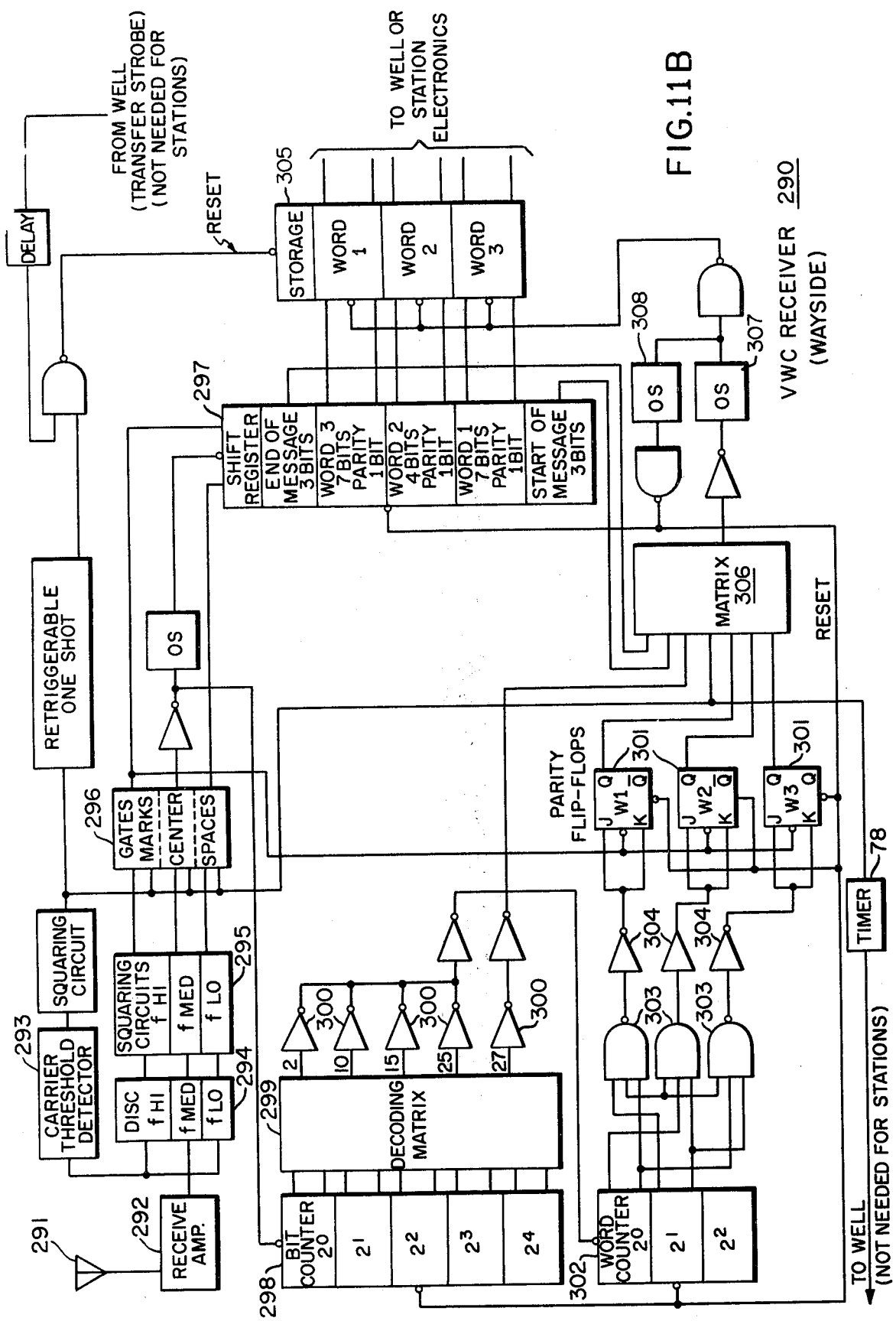
FIG. 11B is a drawing of vehicle to wayside receiver means.

As previously described there is a necessity for vehicle to wayside communication as generally shown in FIG. 2. Vehicle to wayside communication equipment known hereafter as VWC is shown in FIGS. 11A-B and provides for the transmission and the information from the vehicle to the wayside as selected locations along the guideway GW. The VWC message contains information relative to the identity of the vehicle, route assignments for the vehicle, vehicle malfunction reports, positioning of the vehicle at the station platform and door open requests.

Referring to FIG. 11A, a typical on-board transmitter 250 is shown. In the transmitter 250 inputs to be encoded are applied to input gates 251 and these are scanned in sequence by buffers in 252 which are driven through decode matrices included therein from decade counters 253, 254 and 255. The counters 253 through 255 are driven by a flip-flop 256 which is in turn toggeled by a clock 257 driving an amplifier 258. The numbers in parenthesis at the outputs of the decoding matrix and buffers 252 indicate the count on which the particular output is activated. At the end of count 1 flip-flops 259 and 260 are both set and until the end of count 9, center frequency is transmitted. The reason for transmitting center frequency for this length of time is to permit the wayside receiver 290 squelch to open. At the end of count 9 flip-flop 259 is reset and at the start of count 10 the scanning of the input gate 251 starts. The output of the gates 251 is a series of serial stream of non-return to zero pulses. These pulses go to gates 262 through 264 which convert them to return to zero pulses and separate them into mark, space and center frequency keying pulses. The keying pulses allow the low medium and high frequencies to be applied to the output amplifier 265 which drives antenna 266.

For purposes of security, an odd parity bit is inserted after every word. This is accomplished by first converting the non-return to zero pulses from the input gates 251 to return to zero pulses and allow these pulses to toggle flip-flop 271. For each word bit of the input gate 251, an output is provided through amplifier 267 to the input of AND gate 268 which is also driven by the output from the flip-flop 245. The output of AND gate 268 is amplified at 269 and drives the flip-flop 271 for each word pulse. At the end of each word, a count from the counter, as indicated by counts (20), (25) and (33), allows the condition of the flip-flop 271 to be toggled into the message format. If the flip-flop 271 was toggled an odd number of times, then the parity bit is inserted as a space pulse, i.e., no output at all. However, if the flip-flop had been an even number of times, then the parity bit for that word is inserted as a mark pulse as indicated by the Q output of the flip-flop 271, which is fed to AND gate 270. At the end of the count which allowed the status flip-flop 271 to be observed; that is, counts (20), (25) and (33), it is reset by the one-shot 272 which has an on-time very short in comparison to the time for one bit of information. At the end of the count (36), flip-flop 260 is reset which shuts off the transmission by disabling one input each to AND gates 262, 263 and 264. When the counters 253 through 255 reach a count of (500), a reset pulse is initiated which resets flip-flop 256 and the three counters 253-55 wherein the cycle starts all over again.

Thus, it is seen from this drawing and the explanation contained herein that every word transmitted by the output amplifier 265 has an odd number of bits which may be checked at the receiver end as security for the system.

At the wayside (see FIG. 11B) a wayside receiver unit 290 receives the frequency shift keyed signal from the wayside loop 20 via its antenna 291. If the signals from receiver amplifier 292 are sufficiently strong as determined by carrier threshold detector 293, then mark, space and center frequency pulses are produced at the output of the discriminator 294 which are processed through squaring circuits 295 and gates 296. The message is driven into a shift register 297 and at the same time a bit counter 298 is driven which through a decoding matrix 299 and buffers 300, allows the parity flip-flops 301 to be toggled by the mark pulses pertaining to that word as determined by word counter 302, gates 303 and amplifiers 304. The number of marks per word is always odd so at the end of a properly received word all three parity flip-flops 301 must have their outputs in a high or one state. At the end of the message transmission, the carrier ceases and the information contained in the shift register 297 is gated into permanent storage 305 if all three words pass the parity check, the number of bits preselected is proper. Once the information is placed in storage 305, matrix 306 provides a signal through one-shots 307-308 for initiating a reset for the shift register 297, the parity flip-flops 301 and bit and word counters 298 and 302 respectively. Permanent storage is reset when it has been ascertained by re-triggerable one-shot 304 that the communication link no longer exists (i.e., carrier frequency has stopped between the vehicle and the wayside and that the transfer has been complete.

Figure 12A:
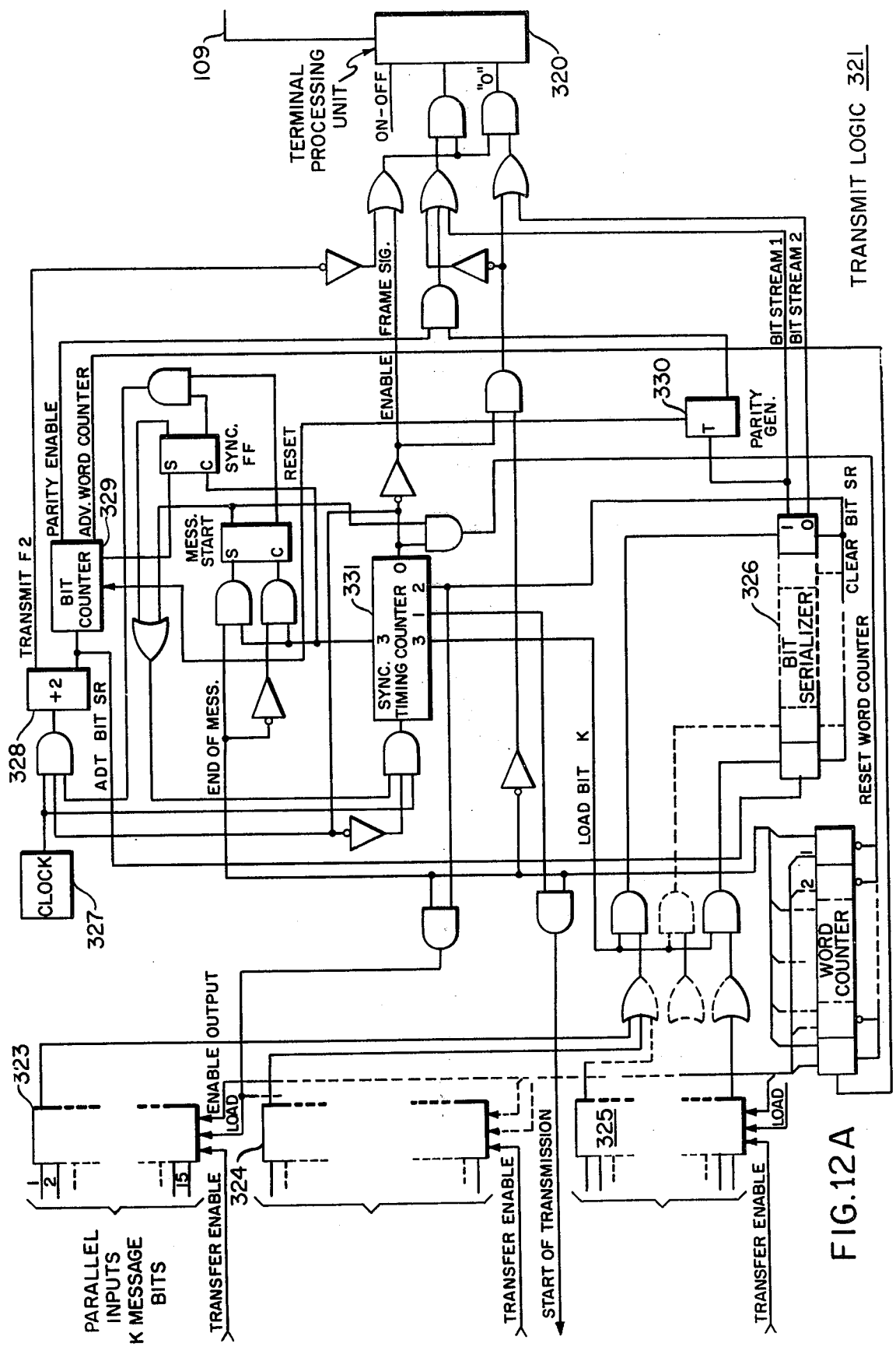
FIGS. 12A-B show means to transmit logic for communication from the wayside to the terminal processors.
Figure 12B:
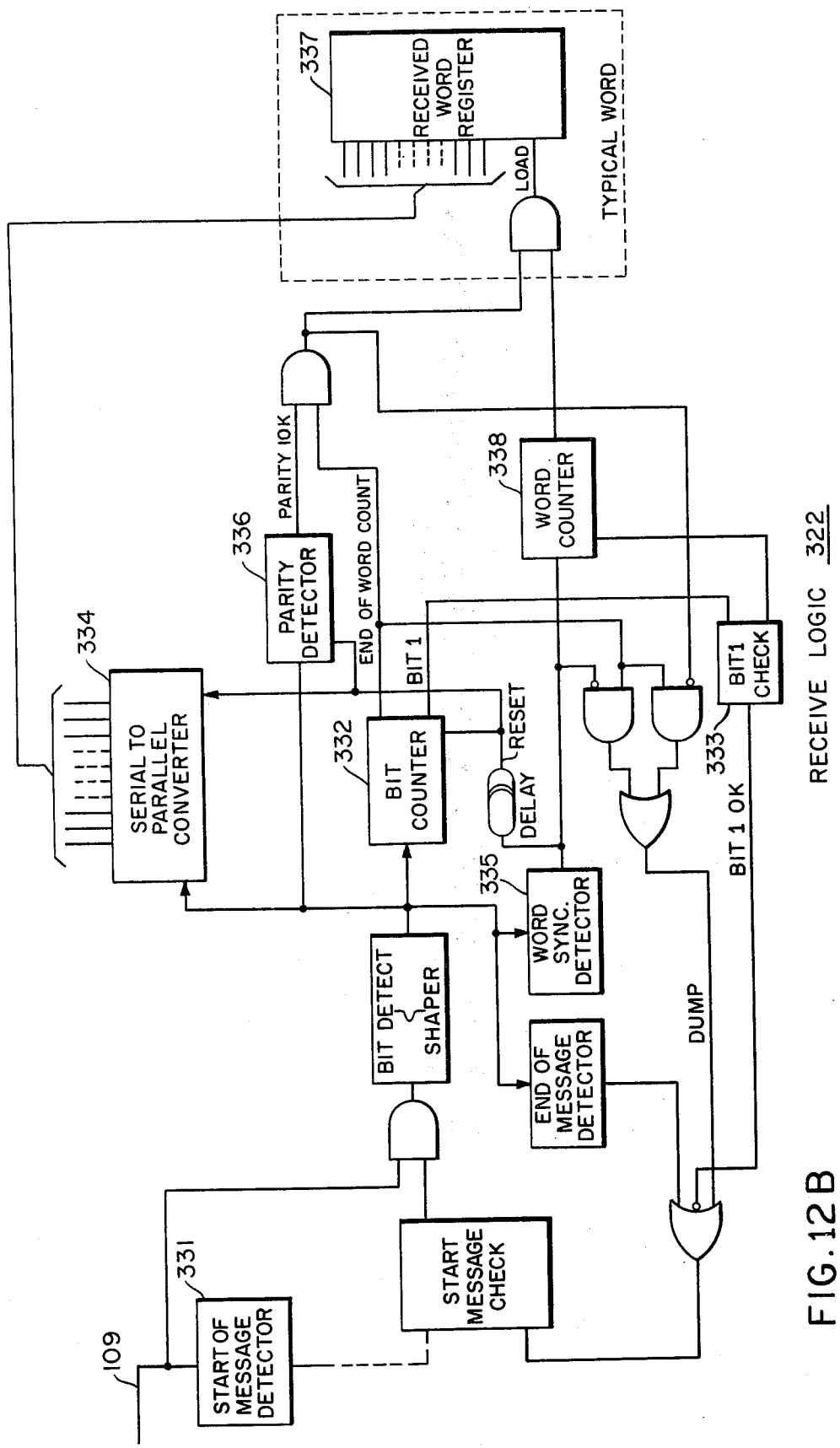

Terminal processers 320, shown in FIGS. 12A-B, are provided for constant communication for a number of wayside receivers 290 and the central processor. Additional communication equipment must be supplied in order to process digital information for transmission to and from the terminal processors 320. Messages are transmitted to and from the terminal processing unit 320 and the wayside receiver unit 290. The receiver 290 includes transmit logic 321 and the receive logic 322 shown in the figure.

The transmission provided in a return to zero format, with equal times of data signal and zero signal, except for the synchronizing periods, which are three times the normal data interval in this embodiment. The first bit of the first word in the message is transmitted as a data zero signal with the first bit of all remaining words being transmitted as a data ONE, as illustrated. The sixteenth bit of each word is a parity signal which will be transmitted as a data ONE or ZERO as required to make the total number of ONES including the word identity bit equal to an odd number.

The message starts with the transmission of a long data ONE signal to inform the receiver at the terminal processor 320 that a new message is following. During this start of the message synchronizing period, the input registers of the transmitter 323-324-325 are loaded with the information currently available in the vehicle wayside receiver 290 and other monitor functions as assigned.

Prior to the transmission of the first word, the outputs of the register 324 and 325 associated with word one are transferred to a bit serializer 326. The function of the serializer is to generate data ONES and ZEROS at the time interval allocated to each bit in the words. The data rate is governed by the pulsing of an adjustable clock 327 and is fed into a divide by two divider 328 which alternately causes transmission of center frequency and a data bit bearing the body of the word. The number of data bits is monitored by bit counter 329, if after the fifteenth bit has been transmitted, the total number of data ONE bits is even, the parity generator 330 responsive to the bit counter 329 will cause a sixteenth bit to be data ONE.

After transmission of the sixteenth bit, the clock output 327 is diverted from the divider 328 to the synchronization timing counter 331. Its function is to insert a synchronizing pulse of unique character into the message with the pulse terminating a predetermined time interval before the start of the first bit of the following word. THe unique characteristic of the synchronizing pulse is its length, it being three times longer than any data pulse in addition the synchronizing pulse preceding the first word is of data ONE character, while the synchronizing pulse preceding any other word are of data ZERO character.

During transmission of the synchronizing pulse, the bit counter 329 and parity generator 330 are reset. The registers 324 and 325 advance to the next word and load the bit serializer 326 with data for that word. After all the words in a message are transmitted, the transmitter provides one more synchronizing pulse of the data ZERO character and resets all functions to enable the start of a new message. After a short zero interval, the long data ONE start message synchronizing signal is generated and process is repeated. This information is processed in the terminal processing unit 320 which in turn is communicated with a central processing unit as previously noted.

Information from the terminal processing unit 320 is transmitted to the receive logic 322 of the wayside receiver unit 290. The receive logic 322 checks messages only after detection of the start of message synchronizing, as indicated by detector 331. After its detection, a format check is made of each word for the correct character of the first bit of each word, the correct number of bits in each word and the reception of odd parity. If any of the conditions are not met, the receiver dumps its ability to receive any more data until after the detection of a new start of message synchronizing pulse.

Messages are received in the return to zero format with the zero between data bits being used to advance a bit counter 332. After the first bit of the first word is received, it is checked to see that it is a data zero. As indicated by the bit one check 333. If not, the receiver retires until the next start of message signal. A similar check is made of all succeeding words to insure the first bit is a data one. As the message is received bit by bit it is loaded into a serial to parallel converter 334, each bit being counted and examined to see if it is a data ONE bit. Each 16 bits of the message is followed by the word synchronizing pulse and when this pulse is detected at 335 the message is checked to see if the correct number of bits has been received. If there are more or less than sixteen, the receiver is retired without transferring the next word in error into the received word register. As the sixteen bits are counted, a tab is kept of the data ONE bits at the parity detector 336. If, at the end of the word the correct number of bits has been received, but the number retires.

Provided the checks are satisfactory during the word synchronizing period, the data is transferred from the serial to parallel converter 334 to appropriate word received register 337 replacing the data there with new information. These checks including the parity detector 336, the word synchronizing detector 334, and the word counter 338 assures that the message transmitted from the terminal processor 320 to the receive logic 322, is proper.

There has thus been shown a system for controlling the operation of a plurality of vehicles along a guideway from a centralized location. In addition, means has been provided for safety checking the speed of the vehicle and providing safe communications between the vehicle and the wayside so that an unsafe condition cannot arise as a result of communication system failure.

While there has been shown what at present is considered to be the preferred embodiment of the present invention, it would be obvious to those skilled in the art that changes and modifications may be made therein, without departing from the invention and it is therefore aimed in the appended claims to cover all such changes and modifications as fall within the true spirit and scope of the invention.

What is claimed is:

1. A vehicle control system for operating vehicles over a right-of-way divided into a plurality of zones and having control means for governing the operation of the vehicles in accordance with the traffic conditions communicated from the wayside to the vehicle wherein the improvement comprises:
   a. means on the vehicle for demarcating ends thereof;
   b. wayside marker means at an entering boundary of each zone responsive to the passage of each end of the vehicle for respectively assuming a first or second condition in accordance with the passage of an odd or even number of demarcating means respectively;
   c. occupancy means for each zone responsive to its associated wayside marker for registering occupancy in accordance with said first condition until cancelled; said means, governing the occupany means, governed jointly by the first condition for the next two wayside markers in advance of the vehicle and a second condition for its associated marker for cancelling the occupancy indication.

2. The vehicle control system of claim 1 wherein said demarcating means comprises a magnet on each end of the vehicle having the same polarity at opposite ends of each magnet.

3. The vehicle control system of claim 2 wherein said wayside means comprises:
   a bi-stable switch responsive to the demarcating means for producing the first output after the passage of a magnet having its polarity to a first condition and producing the second output upon the passage of a magnet of the opposite polarity.

4. The vehicle control system of claim 3 wherein said wayside marker further includes a repeater relay of said bi-stable switch for operating a plurality of contacts for said occupancy and reset means.

5. The vehicle control system of claim 3 wherein said occupancy means comprises:
   a. means responsive to the bi-stable switch including a neutral stick relay having its stick circuit opened in response to the first condition of said bi-stable switch and;
   b. a memory means including a magnetic stick relay having a drive down and pick-up circuit, assuming an energized condition indicative of occupancy in accordance with the first condition of said bi-stable switch and a de-energized condition indicative of the passage of the vehicle out of the zone in accordance with the reset of the stock relay of the zone preceding the associated zone.

6. The vehicle control system of claim 5 wherein said reset means comprises a circuit for picking the neutral stick relay governed jointly by a contract of the bi-stable switches in the first condition for two blocks in advance of the associated zone, a contact of the memory means and the bi-stable switch in respective first and second conditions for one block in advance of the associated block and a contact of the memory means and the bi-stable switch in the second condition for the associated block.

7. The vehicle control system of claim 5 wherein said magnetic stick relay for an occupied zone is reset to its first condition through a pick-up circuit including a front contact of said neutral stick relay for the zone rearward of the associated zone.

* * * * *